(12) United States Patent
Nagura et al.

(10) Patent No.: US 9,162,590 B2
(45) Date of Patent: Oct. 20, 2015

(54) SEAT SLIDE APPARATUS FOR VEHICLE

(71) Applicant: AISIN SEIKI KABUSHIKI KAISHA, Kariya-shi (JP)

(72) Inventors: Mikihito Nagura, Okazaki (JP); Naoaki Hoshihara, Obu (JP); Shinya Isobe, Nagoya (JP)

(73) Assignee: AISIN SEIKI KABUSHIKI KAISHA, Kariya-shi (JP)

( * ) Notice: Subject to any disclaimer, the term of this patent is extended or adjusted under 35 U.S.C. 154(b) by 88 days.

(21) Appl. No.: 13/939,663

(22) Filed: Jul. 11, 2013

(65) Prior Publication Data

US 2014/0021322 A1    Jan. 23, 2014

(30) Foreign Application Priority Data

Jul. 17, 2012    (JP) .................................. 2012-158776

(51) Int. Cl.
| | | |
|---|---|---|
| *F16M 13/00* | (2006.01) | |
| *B60N 2/08* | (2006.01) | |
| *B60N 2/07* | (2006.01) | |
| *B60N 2/12* | (2006.01) | |
| *B60N 2/44* | (2006.01) | |

(52) U.S. Cl.
CPC ................ *B60N 2/0837* (2013.01); *B60N 2/07* (2013.01); *B60N 2/0705* (2013.01); *B60N 2/0715* (2013.01); *B60N 2/0843* (2013.01); *B60N 2/12* (2013.01); *B60N 2002/4455* (2013.01)

(58) Field of Classification Search
CPC ........ B60N 2/08; B60N 2/01715; B60N 2/12; B60N 2/0843
See application file for complete search history.

(56) References Cited

U.S. PATENT DOCUMENTS

| | | | |
|---|---|---|---|
| 6,341,819 B1 | 1/2002 | Kojima et al. | |
| 6,945,607 B2 | 9/2005 | Kojima | |
| 7,140,683 B2 * | 11/2006 | Rausch et al. | ................. 297/341 |
| 7,717,490 B2 * | 5/2010 | Kojima et al. | ............. 296/65.13 |
| 8,146,978 B2 | 4/2012 | Kojima et al. | |
| 8,864,093 B2 * | 10/2014 | Nagura et al. | ................. 248/429 |
| 2009/0058169 A1 * | 3/2009 | Soga | .......................... 297/463.1 |

FOREIGN PATENT DOCUMENTS

JP    2004-122798    4/2004

OTHER PUBLICATIONS

U.S. Appl. No. 13/759,322, filed Feb. 5, 2013, Mikihito Nagura, et al.

* cited by examiner

*Primary Examiner* — Amy Sterling
(74) *Attorney, Agent, or Firm* — Oblon, McClelland, Maier & Neustadt, L.L.P.

(57) ABSTRACT

A seat slide apparatus for a vehicle includes a second unlock mechanism rotating an unlock lever in a direction that unlocks a lock mechanism by pushing the unlock lever in accordance with a predetermined seat operation, an unlocked state retaining lever retaining the lock mechanism in an unlocked state cooperating with the second unlock mechanism by operating in conjunction with the second unlock mechanism, a first unlocked state release mechanism moving the unlocked state retaining lever to a position where the lock mechanism is released from the unlocked state by making contact with an operation body in accordance with movement of an upper rail relative to an lower rail, and a second unlocked state release mechanism moving the unlocked state retaining lever to a position where the lock mechanism is released from the unlocked state by pushing the unlocked state retaining lever in accordance with the operational input.

14 Claims, 23 Drawing Sheets

SEAT SLIDE APPARATUS FOR VEHICLE

CROSS REFERENCE TO RELATED APPLICATIONS

This application is based on and claims priority under 35 U.S.C. §119 to Japanese Patent Application 2012-158776, filed on Jul. 17, 2012, the entire content of which is incorporated herein by reference.

TECHNICAL FIELD

This disclosure generally relates to a seat slide apparatus for a vehicle.

BACKGROUND DISCUSSION

In general, a seat slide apparatus for a vehicle includes a lower rail to be retained to a vehicle floor, an upper rail retaining a seat, the upper rail provided movably relative to the lower rail, and a lock mechanism for restraining movement of the upper rail relative to the lower rail. In the seat slide apparatus for a vehicle, a seat position in a vehicle frontward-rearward direction may be adjusted by releasing the lock mechanism from a restrained state to an unlocked state where the upper rail is allowed to move relative to the lower rail.

Furthermore, a known seat slide apparatus includes a function generally known as a walk-in function. The walk-in function brings a lock mechanism of the known seat slide apparatus to an unlocked state in accordance with an operation to knock down a seat back in a frontward direction and retains the lock mechanism in the unlocked state.

For example, a known seat slide apparatus disclosed in JP2004-122798A, hereinafter referred to as Reference 1, includes an unlock lever and an unlocked state retaining lever. The unlock lever rotationally moves in conjunction with an operation to knock down a seat back in a frontward direction to unlock a lock mechanism. The unlocked state retaining lever restrains the unlock lever from making rotational movement by engaging with the unlock lever. The unlock lever is restrained from making rotational movement at a position at which the unlock lever unlocks the lock mechanism. Accordingly, the lock mechanism is retained in an unlocked state in which the lock mechanism is unlocked. Furthermore, in the known seat slide apparatus according to Reference 1, a sensor bracket is arranged on a lower rail. In a case in which a walk-in function is operated, the sensor bracket and an end portion of an unlocked state release lever, which is integrally formed with the unlocked state retaining lever, make contact in accordance with an upper rail moving relative to the lower rail. As a result of the sensor bracket and the end portion of the unlocked state release lever making contact with each other, the unlocked state retaining lever makes rotational movement that disengages the unlocked state retaining lever and the unlock lever so that the lock mechanism is released from the state where the lock mechanism is maintained in the unlocked state.

In other words, the configuration of the known seat slide apparatus according to Reference 1 retains the lock mechanism in the unlocked state unless the upper rail moves to a position at which the unlocked state release lever makes contact with the sensor bracket. As a result, in order to adjust a seat to a desired position during sliding movement, the seat is required to move to a position where the seat is released from the state in which the seat is retained in the unlocked state first, then the seat is required to make the lock mechanism unlocked again to adjust the seat to the desired position, which is considered as a drawback.

A need thus exists for a seat slide apparatus for a vehicle, which is not susceptible to the drawback mentioned above.

SUMMARY

A seat slide apparatus for a vehicle includes a lower rail configured to be retained on a floor portion of the vehicle, an upper rail configured to retain a seat, the upper rail configured to move relative to the lower rail, a lock mechanism configured to restrain movement of the upper rail relative to the lower rail, a first unlock mechanism including an unlock lever making rotational movement in response to an operational input at an operation lever, the first unlock mechanism operating the lock mechanism to unlock by the rotational movement of the unlock lever, a second unlock mechanism making the unlock lever rotationally move in a direction that unlocks the lock mechanism by pushing the unlock lever in accordance with a predetermined seat operation, an unlocked state retaining lever configured to retain the lock mechanism in an unlocked state cooperating with the second unlock mechanism by operating in conjunction with the second unlock mechanism to move to a position where the lock mechanism is retained in the unlocked state, a first unlocked state release mechanism moving the unlocked state retaining lever to a position where the lock mechanism is released from being retained in the unlocked state by making contact with an operation body in accordance with movement of the upper rail relative to the lower rail, and a second unlocked state release mechanism moving the unlocked state retaining lever to a position where the lock mechanism is released from being retained in the unlocked state by pushing the unlocked state retaining lever in accordance with the operational input.

BRIEF DESCRIPTION OF THE DRAWINGS

The foregoing and additional features and characteristics of this disclosure will become more apparent from the following detailed description considered with the reference to the accompanying drawings, wherein.

DETAILED DESCRIPTION

Figure 1:
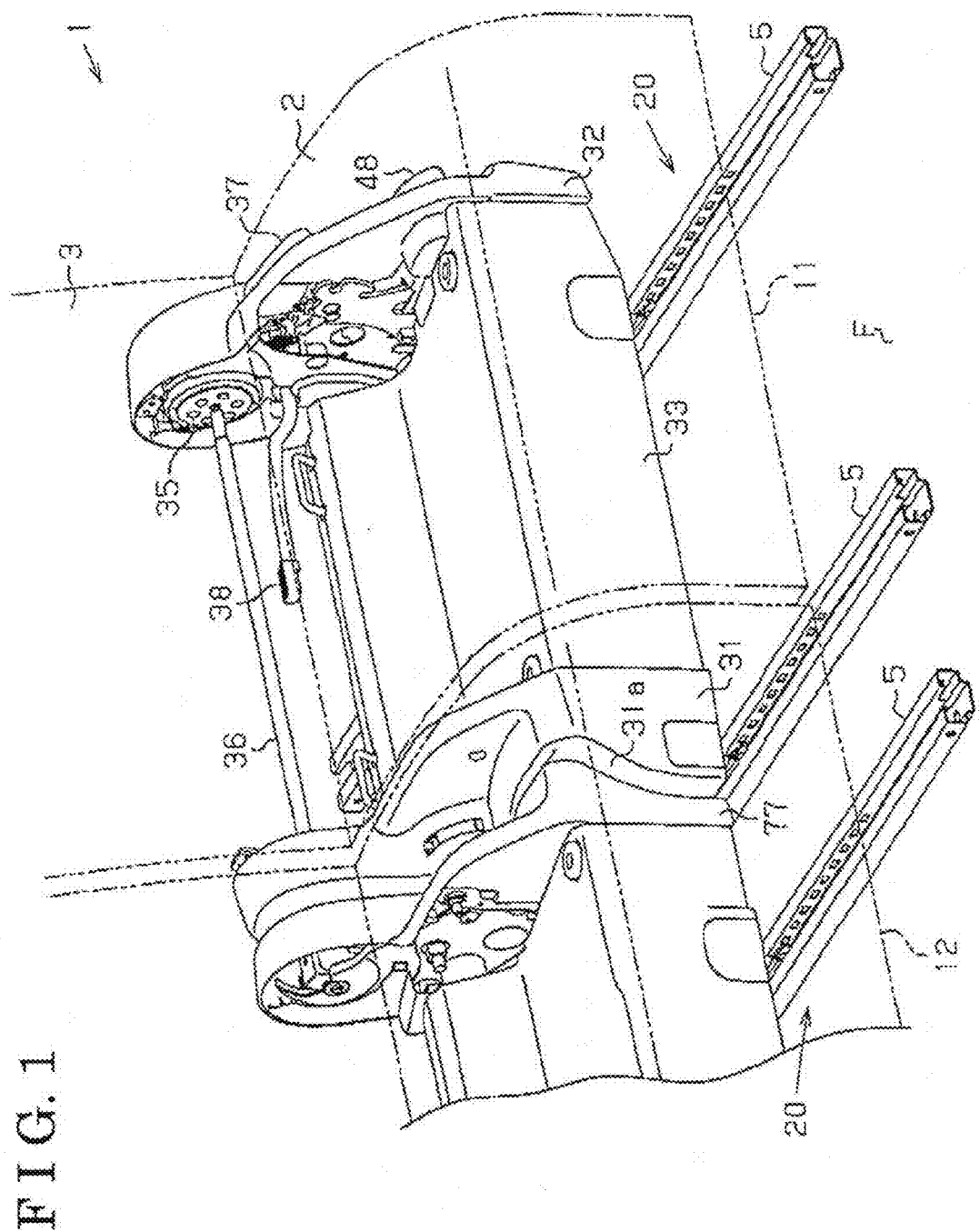
FIG. 1 is a perspective view drawing illustrating a vehicle seat of a seat slide apparatus for a vehicle according to a first embodiment.

A seat slide apparatus for a vehicle according to a first embodiment will be described referring to drawings. As FIG. 1 illustrates, a vehicle seat 1, which serves as a seat, includes a seat cushion 2 and a seat back 3. The seat back 3 is arranged such that the seat back 3 freely makes tilting movement relative to a rearward end portion of the seat cushion 2. The vehicle seat 1 is arranged such that the vehicle seat 1 may be divided into a seat 11 and a seat 12, which are a pair of seats separated into a rightward seat and a leftward seat. The vehicle seat 1 is provided as a rear seat, which more specifically is a second row seat. Each of the seat 11 and the seat 12 may adjust position in a vehicle frontward-rearward direction independently. Furthermore, each of the seat 11 and the seat 12 may adjust tilting angle of the seat back 3 independently.

More specifically, lower rails 5 are arranged on a floor portion F of the vehicle at positions corresponding to each of the seat 11 and the seat 12. At each position two lower rails 5 are provided as a set and are arranged parallel to each other. In the seat slide apparatus for a vehicle according to the first embodiment, each of the seat 11 and the seat 12 is configured to adjust position in the vehicle frontward-rearward direction by making a seat slide device 20 that is formed at each of the lower rails 5 provided for each of the seat 11 and the seat 12 to function.

Note that, basic configurations of the seat slide device 20 for the seat 11 and that for the seat 12 are similar and basic configurations of seat reclining devices 35 for the seat 11 and those for the seat 12, which will be described later, are similar. Accordingly, for convenience, common parts are described by describing the parts in the seat 11 and descriptions of the parts in the seat 12 will be omitted.

Figure 2:
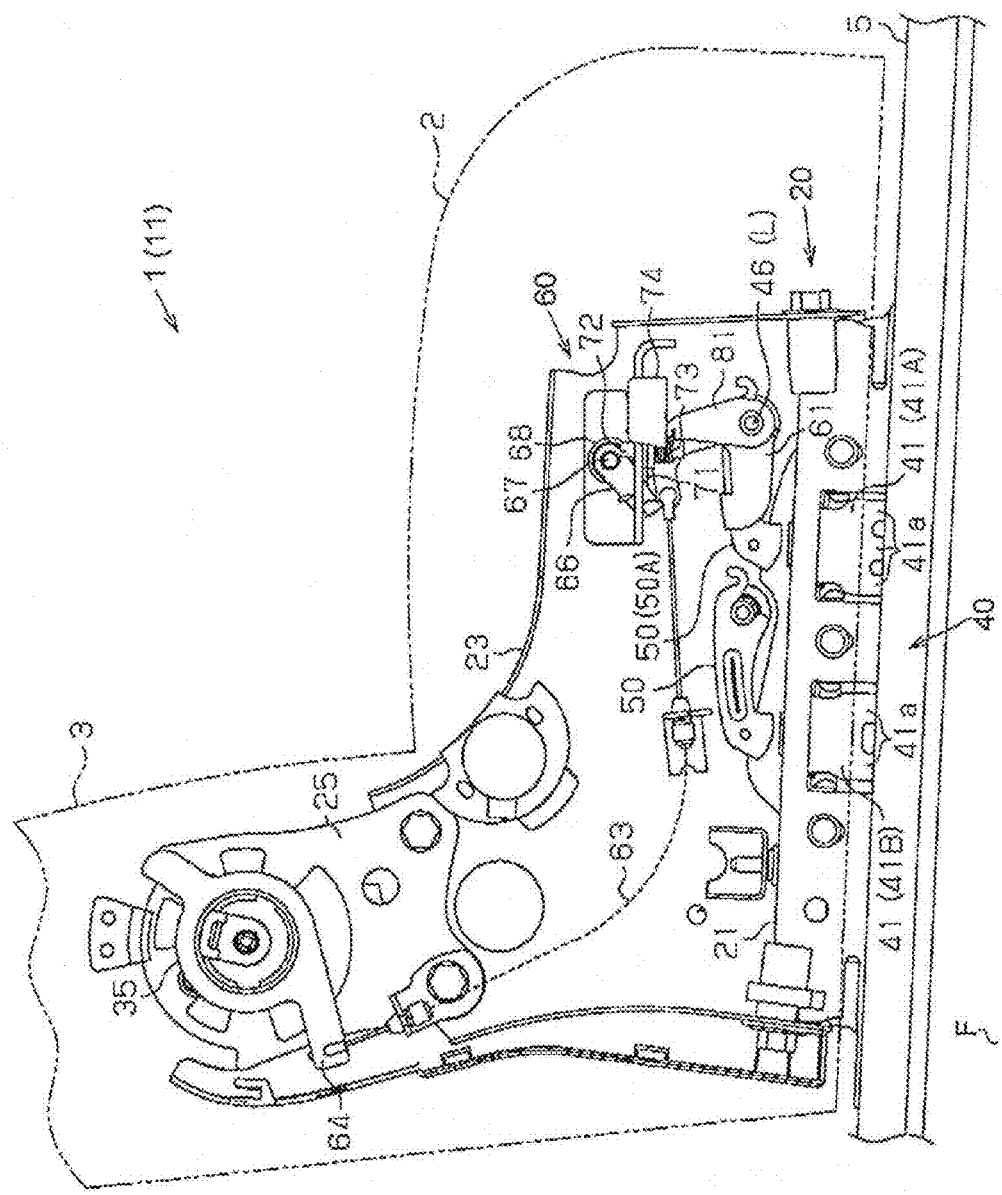
FIG. 2 is a side view drawing illustrating the vehicle seat of the seat slide apparatus for a vehicle according to the first embodiment.
Figure 3:
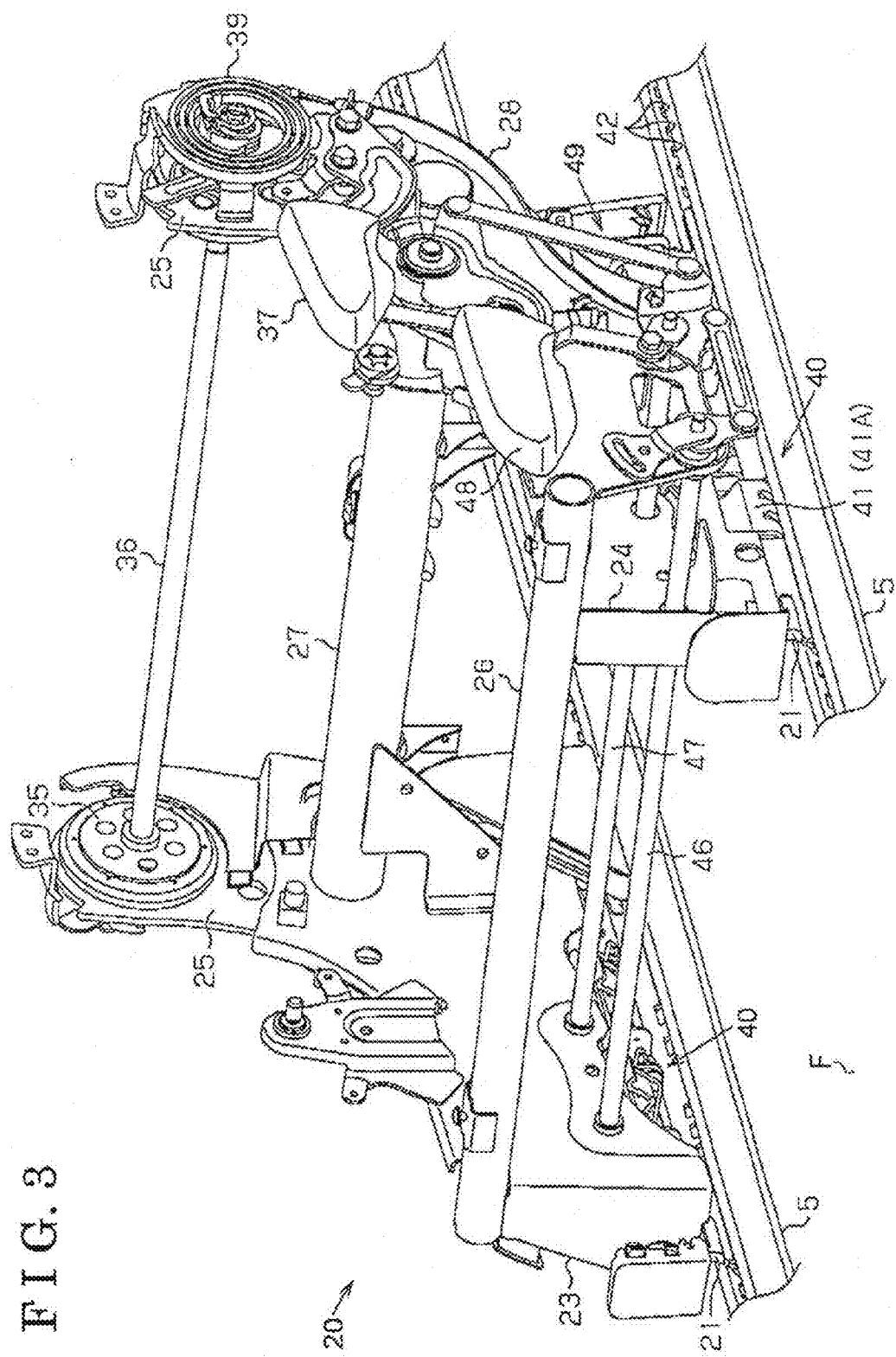
FIG. 3 is a perspective view drawing illustrating a seat slide device and a seat reclining device of the seat slide apparatus for a vehicle according to the first embodiment.
Figure 4:
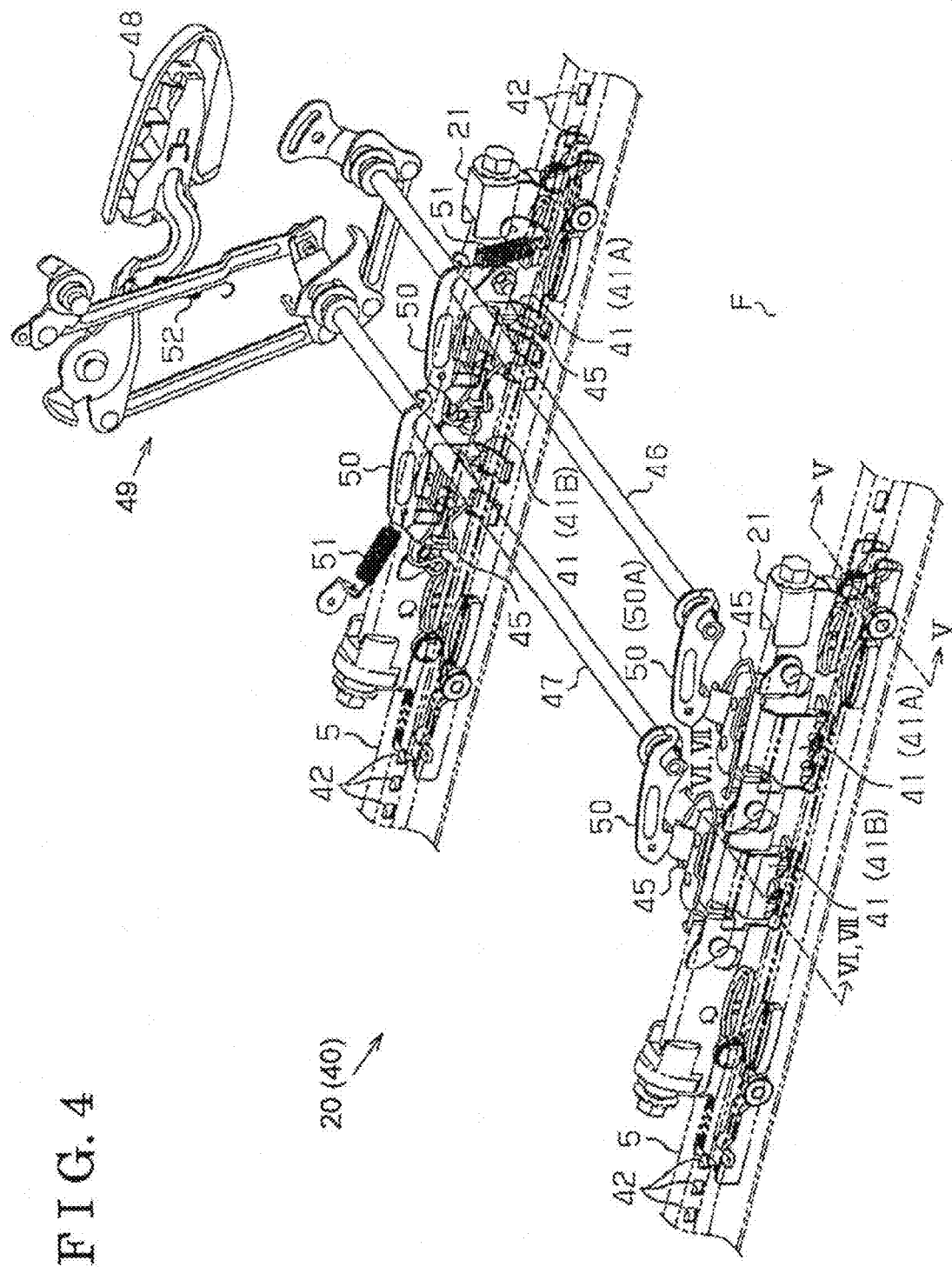
FIG. 4 is a perspective view drawing illustrating a lock mechanism of the seat slide apparatus for a vehicle according to the first embodiment.

As FIGS. 2 to 4 illustrate, the seat slide device 20 includes an upper rail 21 corresponding to each of the lower rails 5. Each of the upper rails 21 is provided movably relative to the lower rail 5. The seat 11 is retained on the upper rails 21. Accordingly, the seat 11 may move on the lower rails 5 together with the upper rails 21.

Figure 5:
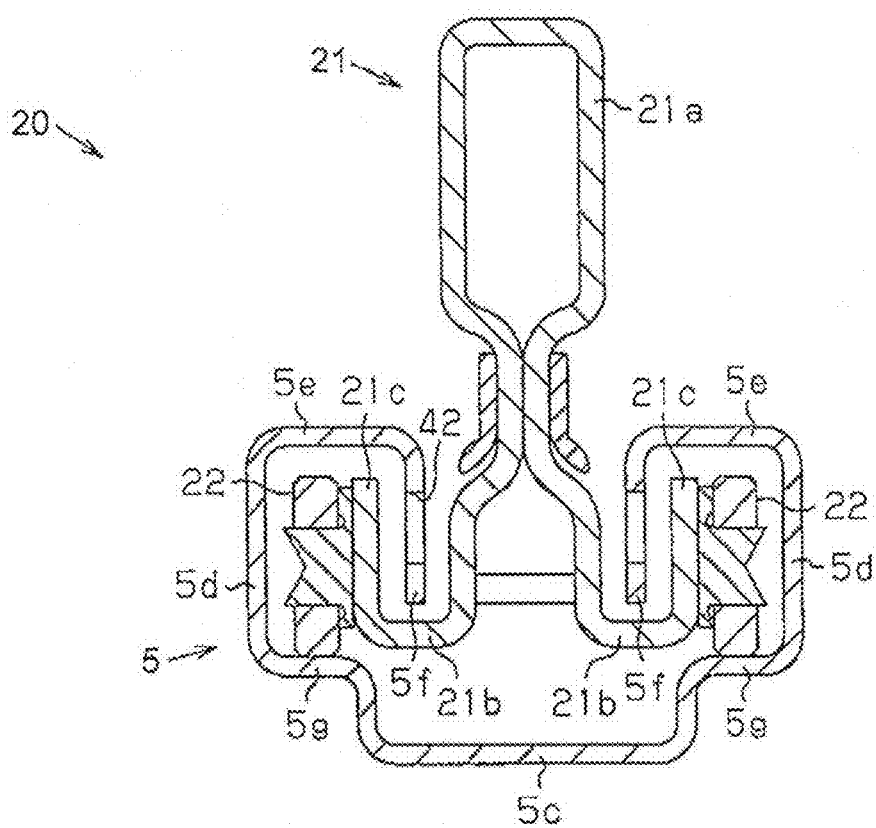
FIG. 5 is a cross-sectional view drawing taken along V-V in FIG. 4 illustrating a general configuration of the seat slide device of the seat slide apparatus for a vehicle according to the first embodiment.

More specifically, as FIG. 5 illustrates, the lower rail 5 includes a bottom wall 5c extending in the vehicle frontward-rearward direction. The vehicle frontward-rearward direction is a direction that is perpendicular to a surface where FIG. 5 is drawn. At each end of the bottom wall 5c in a width direction of the bottom wall 5c, which is a leftward-rightward direction in FIG. 5, an outer wall 5d erects. An upper end of each of the outer walls 5d is folded inwardly in the width direction so that a top wall 5e in a flange form is formed. An end of each of the top walls 5e is folded downwardly to form an inner wall 5f. The inner walls 5f face each other in the width direction with a predetermined distance therebetween.

Each of the upper rails 21 includes a body portion 21a and a pair of protruding portions 21b. The body portion 21a is formed in a U-shape with a closed end protruding in an upward direction and arranged between the inner walls 5f of the lower rail 5. Each of bottom ends of the body portion 21a is folded outwardly in the width direction to form the protruding portion 21b formed in a flange form. Furthermore, the upper rail 21 includes hook portions 21c. Each end portion of the protruding portions 21b is folded upwardly to form the hook portion 21c. Each of the hook portions 21c is arranged in a space surrounded by the outer wall 5d of the lower rail 5, the top wall 5e of the lower rail 5, and the inner wall 5f of the lower rail 5. Each of the hook portions 210 is provided with a multiple number of wheels 22. In the seat slide apparatus for a vehicle according to the first embodiment, each lower rail 5 is provided with two wheels 22. The wheels 22 roll on path portions 5g formed on the bottom wall 5c of the lower rail 5. The wheels 22 roll in a state in which the wheels 22 are in contact with the path portions 5g.

The upper rail 21 of the seat slide apparatus for a vehicle according to the first embodiment is configured such that the upper rail 21 may move in a direction that conforms to an elongating direction of the lower rail 5 by rolling movement of each of the wheels 22. Accordingly, the upper rail 21 runs on the path portions 5g. By arranging each of the protruding portions 21b and each of the hook portions 21c in a space surrounded by the outer wall 5d of the lower rail 5, the top wall 5e of the lower rail 5, and the inner wall 5f of the lower rail 5, the upper rail 21 is restrained from movement in the upward direction relative to the lower rail 5 and restrained from movement in the width direction relative to the lower rail 5. Accordingly, in the first embodiment, a positional relationship between the upper rail 21 and the lower rail 5 is stably retained.

As FIGS. 2 and 3 illustrate, a side frame 23 and a side frame 24 separately erects on each of the upper rails 21. Each of the side frame 23 and the side frame 24 is formed in a plate form. As FIG. 2 illustrates, a connecting portion 25 is arranged to extend upwardly from a rear end portion of the side frame 23, which is one of the side frames 23, 24. The rear end portion of the side frame 23 refers to an end portion of the side frame 23 in a leftward direction in FIG. 2. As FIG. 3 illustrates, two pipes, which are a pipe 26 and a pipe 27, are arranged to bridge between the side frame 23 and the side frame 24. Furthermore, on a side portion of the side frame 24, which is the other one of the side frames 23, 24, a sub frame 28 is arranged at a position substantially parallel to the side frame 24 in a state in which the sub frame 28 retains an end portion of the pipe 26 and an end portion of the pipe 27. Similarly to at the side frame 23, a connecting portion 25 is arranged at a rear end portion of the sub frame 28.

As FIG. 1 illustrates, side shields 31, 32 are arranged to cover the side frame 23, the side frame 24, and the sub frame 28 from an outward direction. Similarly, a center shield 33 is attached to the pipes 26, 27 to cover the pipes 26, 27 arranged to bridge between the side frame 24 and the sub frame 28 from outward. Furthermore, retaining a cushion member above the center shield 33 forms the seat cushion 2 of the seat slide apparatus for a vehicle according to the first embodiment.

Furthermore, as FIGS. 2 and 3 illustrate, a seat reclining device 35 is arranged at an end portion of the side frame 23 and another seat reclining device 35 is arranged at an end portion of the sub frame 28. More specifically, each of the seat reclining devices 35 is arranged on the connecting portion 25 at the side frame 23 and the connecting portion 25 at the sub frame 28 such that the seat reclining devices 35 rotate with a bar 36 that is arranged to bridge between the seat reclining devices 35 as the center of rotational movement. Furthermore, the seat back 3 connects to the seat cushion 2 via the seat reclining devices 35.

Each of the seat reclining devices 35 of the seat slide apparatus for a vehicle according to the first embodiment is provided with a known configuration for restraining and allowing rotational movement of the seat back 3 relative to the seat cushion 2. More specifically, as FIGS. 1 and 3 illustrate, the sub frame 28 is provided with an operation lever 37 and a foot-operated lever 38. The operation lever 37 protrudes in a side direction of the side shield 32 that covers the sub frame 28 from the outward direction. The operation lever 37 is manually operated. The foot-operated lever 38 protrudes in a rearward direction of the seat cushion 2. Furthermore, as FIG. 3 illustrates, the sub frame 28 is provided with a spiral spring 39. In accordance with an elastic force of the spiral spring 39, the seat back 3 is biased in a direction that makes the seat back 3 tilt in a vehicle frontward direction, which is rightward in FIG. 2. In other words, in accordance with the elastic force of the spiral spring 39, the seat back 3 is biased in a direction that knocks down the seat back 3 in a frontward direction. Accordingly, a tilt angle of the seat 11 may be adjusted with an operation of the operation lever 37 and the seat back 3 of the seat 11 may be knocked down in the vehicle frontward direction by operating the foot-operated lever 38.

Furthermore, the seat slide device 20 includes a lock mechanism 40 that may restrain the aforementioned movement of the upper rail 21 relative to the lower rail 5. More specifically, as FIGS. 2 and 4 illustrate, the upper rail 21 is provided with lock levers 41. Each of the lock levers 41 includes a multiple number of locking protrusions 41a. Furthermore, the lower rail 5 is formed with a multiple number of locking through-holes 42 for receiving the locking protrusions 41a of the lock lever 41. The locking through-holes 42 are formed in a direction that conforms to a longitudinal direction of the lower rail 5. Accordingly, the lock mechanism 40 of the seat slide apparatus for a vehicle according to the first embodiment is configured to restrain movement of the upper rail 21 relative to the lower rail 5 by the locking protrusions 41a of the lock lever 41 engaging with the locking through-holes 42 of the lower rail 5.

Figure 6:
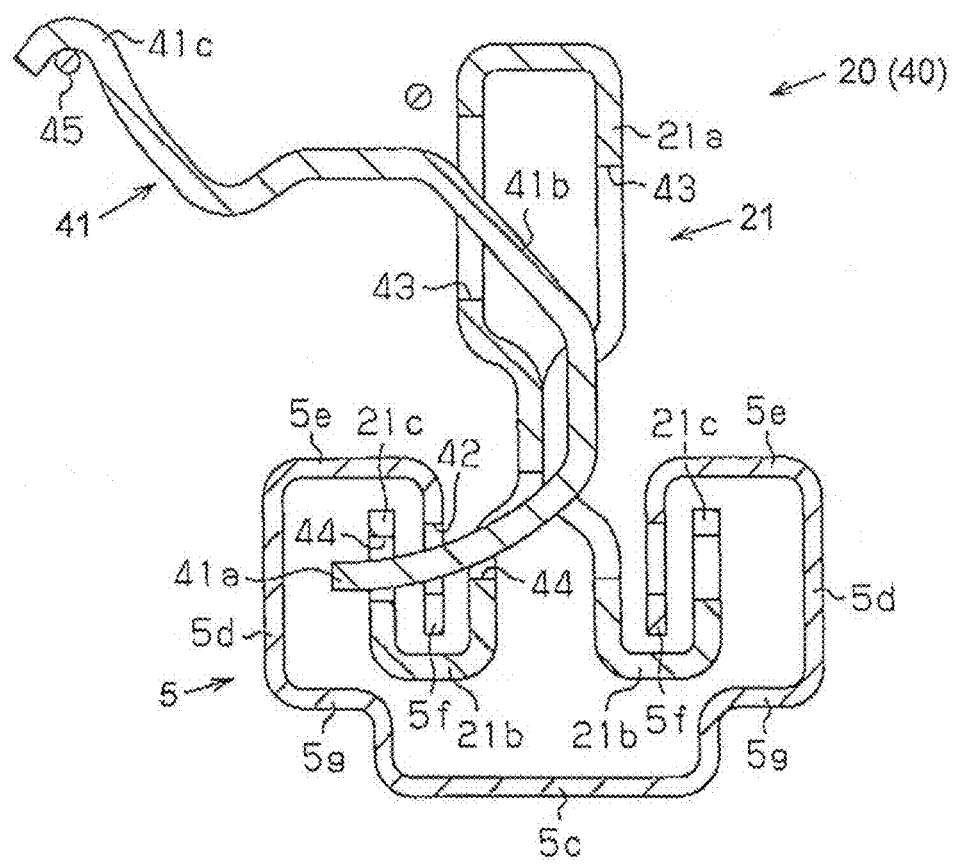
FIG. 6 is a cross-sectional view drawing taken along VI-VI in FIG. 4 illustrating a general configuration of the lock mechanism of the seat slide apparatus for a vehicle according to the first embodiment in a state in which the lock mechanism is locked.
Figure 7:
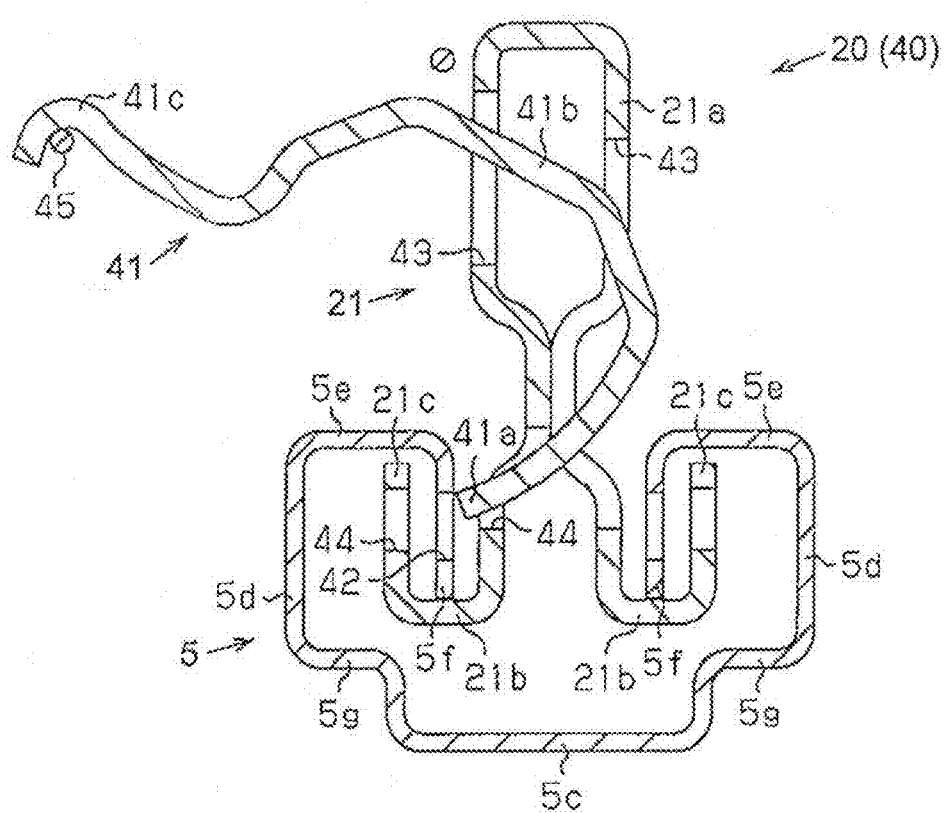
FIG. 7 is a cross-sectional view drawing taken along VII-VII in FIG. 4 illustrating a general configuration of the lock mechanism of the seat slide apparatus for a vehicle according to the first embodiment in a state in which the lock mechanism is operated to unlock.

More specifically, as FIGS. 6 and 7 illustrate, the lock lever 41 includes a body portion 41b having an external form in a curved plate form. Furthermore, the body portion 21a of the upper rail 21 is formed with insertion through-holes 43 extending through the body portion 21a in the width direction through a plate member forming the body portion 21a. Note that the width direction refers to a leftward-rightward direction in FIGS. 6 and 7. Furthermore, the lock lever 41 links to the upper rail 21 in a state in which the body portion 41b is inserted through the insertion through-holes 43.

More specifically, the lock lever 41 includes a rotation shaft that extends in a direction that conforms to an elongating direction of the upper rail 21, which refers to a direction perpendicular to the surface where FIGS. 6 and 7 are drawn. The lock lever 41 is configured to rotationally move at the rotation shaft. Furthermore, on the body portion 21a of the upper rail 21 at a position in a downward direction relative to the insertion through-holes 43 and on the hook portions 21c, a multiple number of insertion through-holes 44 are formed such that the insertion through-holes 44 may receive the locking protrusions 41a of the lock lever 41. Note that, the position in the downward direction relative to the insertion through-holes 43 refers to a position in a downward direction in FIGS. 6 and 7. Furthermore, the upper rail 21 is provided with spring members 45 so as to rotationally bias the lock levers 41 in a direction that makes the locking protrusions 41a inserted into the insertion through-holes 44, which is a clockwise direction in FIGS. 6 and 7.

Accordingly, at a normal time, the lock mechanism 40 of the seat slide apparatus for a vehicle according to the first embodiment is in a locked state, as FIG. 6 illustrates, which is a state in which the lock lever 41 makes rotational movement in accordance with an elastic force of the spring member 45 and the locking protrusions 41a inserted into the insertion through-holes 44 engage with the locking through-holes 42 of the lower rail 5 via the insertion through-holes 44.

Furthermore, the lock lever 41 of the seat slide apparatus according to the first embodiment includes a lever portion 41c. The lever portion 41c is arranged at an end portion of the lock lever 41 that is opposite side to where the locking protrusions 41a are arranged. In a state in which the lever portion 41c is pushed downwardly, the lock lever 41 rotationally moves in a direction that makes the lock mechanism 40 unlock, which is a counterclockwise direction in FIGS. 6 and 7, against the elastic force of the spring member 45. As a result of pushing the lever portion 41c downwardly and the lock lever 41 moving rotationally, the lock mechanism 40 of the first embodiment is operated into an unlocked state in which the locking protrusions 41a are pulled out from the insertion through-holes 44 as FIG. 7 illustrates, which is a state in which the lock mechanism 40 is unlocked by the locking through-holes 42 of the lower rail 5 and the locking protrusions 41a being disengaged.

More specifically, as FIG. 4 illustrates, each of the upper rails 21 is provided with two lock levers, which are a lock lever 41A and a lock lever 41B. The lock lever 41A and the lock lever 41B are arranged in a direction that conforms to a longitudinal direction of the upper rail 21. Furthermore, as FIGS. 3 and 4 illustrate, at positions above the lock levers 41A, 41B, a pair of rotation shafts 46, 47 are arranged such that each of the rotation shaft 46 and the rotation shaft 47 bridges between the side frame 23 and the sub frame 28. Furthermore, similarly to the aforementioned operation lever 37 for a seat reclining operation, the sub frame 28 is provided with an operation lever 48 that protrudes in the side direction of the side shield 32. The operation lever 48 is manually operated. Furthermore, the sub frame 28 is provided with a link mechanism 49 that converts an operational input at the operation lever 48 into rotational movement of the rotation shaft 46 and rotational movement of the rotation shaft 47. Each of the rotation shaft 46 and the rotation shaft 47 is provided with an unlock lever 50. Each of the unlock levers 50 makes rotational movement integrally with each of the rotation shaft 46 and the rotation shaft 47 and downwardly pushes the lever portion 41c of each of the lock lever 41A and the lock lever 41B. Note that, the rotation shaft 46, the rotation shaft 47, the link mechanism 49, and the unlock lever 50 serves as a first unlock mechanism.

More specifically, by an operation of the operation lever 48 by an operator, which is an operation to pull the operation lever 48 upwardly in a case with the seat slide apparatus for a vehicle according to the first embodiment, each of the rotation shaft 46 and the rotation shaft 47 makes rotational movement. Accordingly, the unlock lever 50 arranged on the rotation shaft 46 and the unlock lever 50 arranged on the rotation shaft 47 push the lock lever 41A and the lock lever 41B, respectively. As a result, the lock mechanism 40 is operated into the unlocked state in which the lock mechanism 40 is unlocked.

Note that, in the seat slide apparatus for a vehicle according to the first embodiment, each of the unlock levers 50 is biased by an elastic force of a coil spring 51. Each of the unlock levers 50 is biased in a direction opposite to a direction in which each of the unlock levers 50 pushes down the lock lever 41A and the lock lever 41B. Similarly, an elastic force of a coil spring 52 biases the operation lever 48. The operation lever 48 is biased in a direction in which the operation lever 48 moves to a position before the operation of the operation lever 48. Accordingly, in the first embodiment, the lock mechanism 40 is returned to the locked state in a state where the operator ceases to provide the operational input at the operation lever 48.

A walk-in function of the seat slide apparatus for a vehicle according to the first embodiment will be described next.

As FIG. 2 illustrates, the side frame 23 of the seat 11 is provided with an unlocked state retaining mechanism 60. The unlocked state retaining mechanism 60 is configured to operate in conjunction with an operation to knock down the seat back 3 in the frontward direction to operate the lock mechanism 40 to unlock and retains the lock mechanism 40 in the unlocked state.

Figure 8:
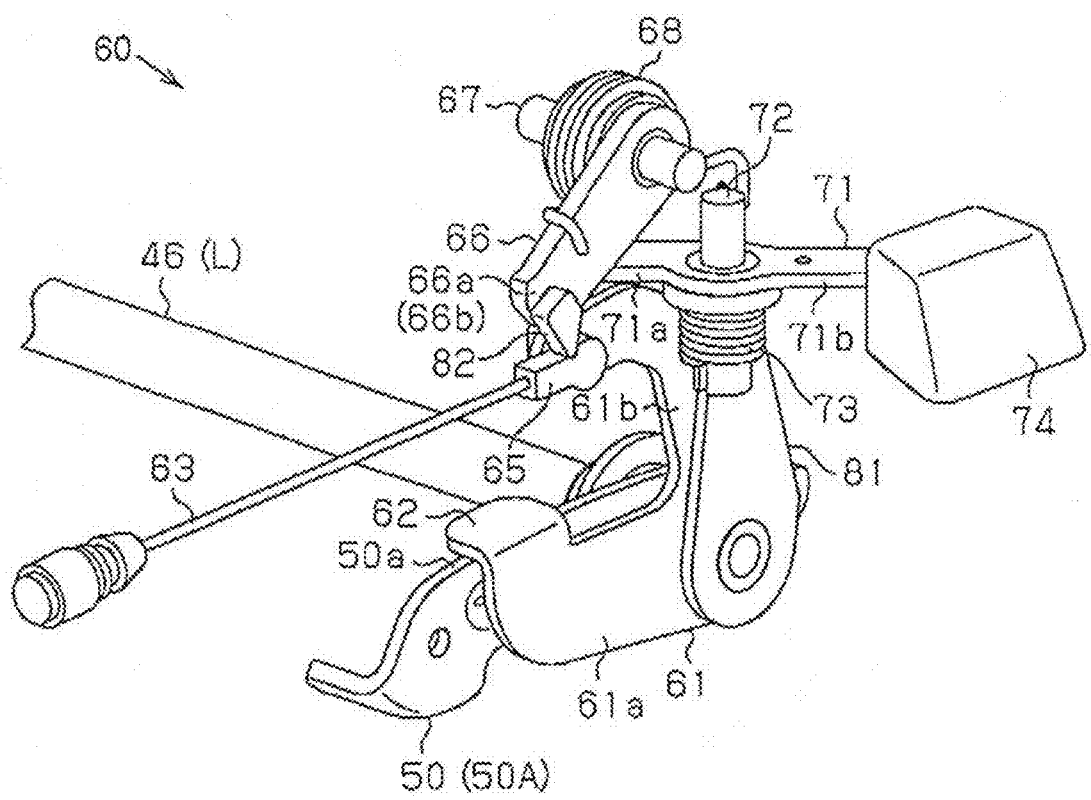
FIG. 8 is a perspective view drawing illustrating an unlocked state retaining mechanism of the seat slide apparatus for a vehicle according to the first embodiment.
Figure 9:
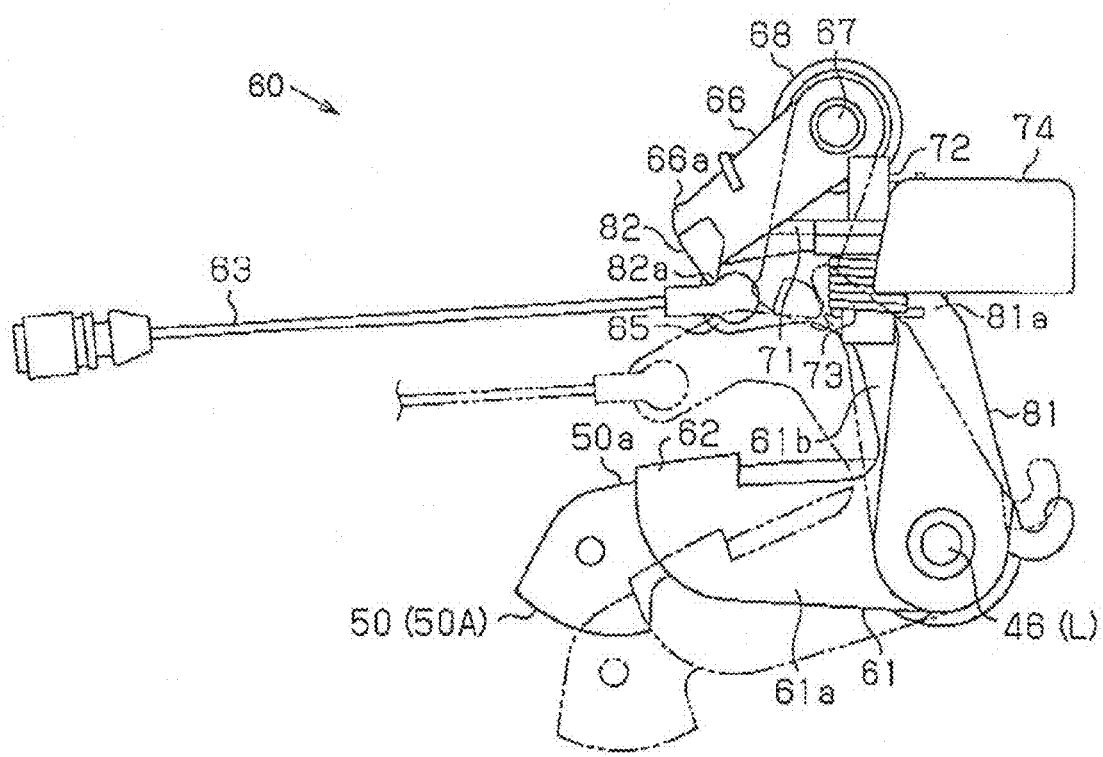
FIG. 9 is a side view drawing illustrating the unlocked state retaining mechanism of the seat slide apparatus for a vehicle according to the first embodiment.

More specifically, as FIGS. 8 and 9 illustrate, the unlocked state retaining mechanism 60 of the seat slide apparatus for a vehicle according to the first embodiment includes a second unlock lever 61 having a common center of rotational movement L with the unlock lever 50 and arranged at a position parallel to the unlock lever 50.

In the seat slide apparatus for a vehicle according to the first embodiment, the second unlock lever 61 is arranged at a position parallel to an unlock lever 50A and shares a common axis with an unlock lever 50A on the upper rail 21 that is provided with the side frame 23. Note that, the unlock lever 50A is the unlock lever 50 that corresponds to the lock lever 41A. The lock lever 41A is the lock lever 41 arranged at a position in the vehicle frontward direction. Furthermore, the second unlock lever 61 includes a push lever portion 61a and a connecting lever portion 61b. The push lever portion 61a extends in a longitudinal direction of the unlock lever 50A with the center of rotational movement L of the second unlock lever 61 as a proximal end. Note that, the longitudinal direction of the unlock lever 50A refers to a rightward-leftward direction in FIG. 9. The connecting lever portion 61b extends in an upward direction with the center of rotational movement L as a proximal end. Note that the upward direction refers to the upward direction in FIG. 9. A distal end of the push lever portion 61a is folded toward the unlock lever 50A so that a push flange 62 is formed. The push flange 62 is formed such that the push flange 62 may contact an upper end portion 50a of the unlock lever 50A.

Furthermore, as FIG. 2 illustrates, the seat reclining device 35 provided on the connecting portion 25 of the side frame 23 is formed with a pulling portion 64. The pulling portion 64 rotationally moves in accordance with knock down movement of the seat back 3 in the frontward direction and pulls up a wire 63 that is connected to an end of the pulling portion 64. As FIG. 9 illustrates, a connecting portion 65 is provided at a distal end of the connecting lever portion 61b, which is a portion of the second unlock lever 61. The other end of the wire 63 connects to the connecting portion 65. Note that, the second unlock lever 61, the wire 63, and the pulling portion 64 serve as a second unlock mechanism.

More specifically, in accordance with a pull force of the wire 63, which is a force generated by the knock down movement of the seat back 3 in the frontward direction, the second unlock lever 61 rotationally moves in a direction in which the connecting lever portion 61b is pulled in a rearward direction, which is rotational movement in a counterclockwise direction in FIG. 9. Note that, the rearward direction refers to leftward in FIG. 9. Furthermore, the rotational movement makes the push flange 62 arranged on the second unlock lever 61 to push the upper end portion 50a of the unlock lever 50A. In accordance with a push force of the push flange 62, the unlock lever 50A and the second unlock lever 61 make rotational movements together.

As FIG. 4 illustrates, in the seat slide apparatus for a vehicle according to the first embodiment, the rotational movement of the unlock lever 50A is transmitted to the other unlock lever 50 via the rotation shaft 46 at which the unlock lever 50A is retained, the link mechanism 49, and the rotation shaft 47. In the unlocked state retaining mechanism 60 of the first embodiment, the lock mechanism 40 provided with the lock levers 41 is operated to unlock by each of the unlock levers 50 pushing down the corresponding lock lever 41, which is either the lock lever 41A or the lock lever 41B.

Furthermore, as FIGS. 2, 8 and 9 illustrate, the unlocked state retaining mechanism 60 of the seat slide apparatus for a vehicle according to the first embodiment includes an unlocked state retaining lever 66. The unlocked state retaining lever 66 is configured to rotationally move in a state in which the unlocked state retaining lever 66 is in contact with an outer peripheral portion of the second unlock lever 61. After the second unlock lever 61 rotationally moves and unlocks the lock mechanism 40, the unlocked state retaining lever 66 and the second unlock lever 61 cooperate to retain the lock mechanism 40 in the unlocked state.

More specifically, as FIGS. 8 and 9 illustrate, the unlocked state retaining lever 66 includes a rotation shaft 67. The rotation shaft 67 is arranged at a position in an upward direction relative to the second unlock lever 61. Note that, the upward direction refers to an upward direction in FIGS. 8 and 9. The rotation shaft 67 is arranged such that the rotation shaft 67 is substantially parallel to the center of rotational movement L of the second unlock lever 61, which is the rotation shaft 46. An end portion 66a of the unlocked state retaining lever 66 is configured to make contact with the outer peripheral portion of the second unlock lever 61 biased by a helical torsion spring 68 fit to the rotation shaft 67. Note that, the helical torsion spring 68 biases the unlocked state retaining lever 66 in the counterclockwise direction in FIG. 9.

Figure 10A:
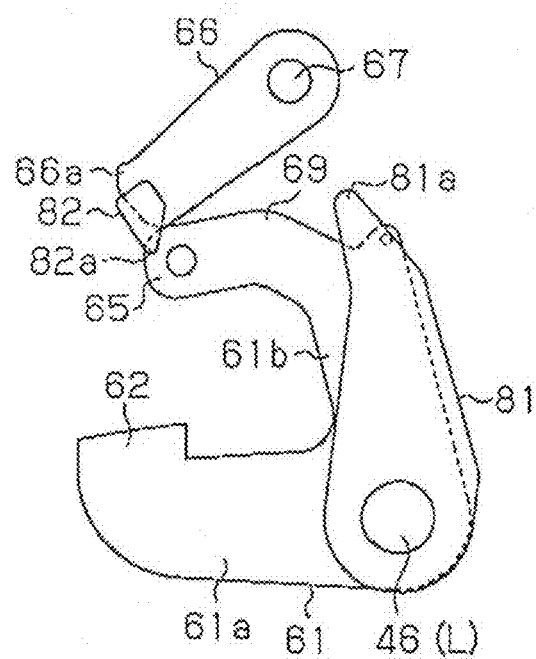
FIG. 10A is a drawing illustrating an operation of an unlocked state retaining lever of the seat slide apparatus for a vehicle according to the first embodiment.
Figure 10B:
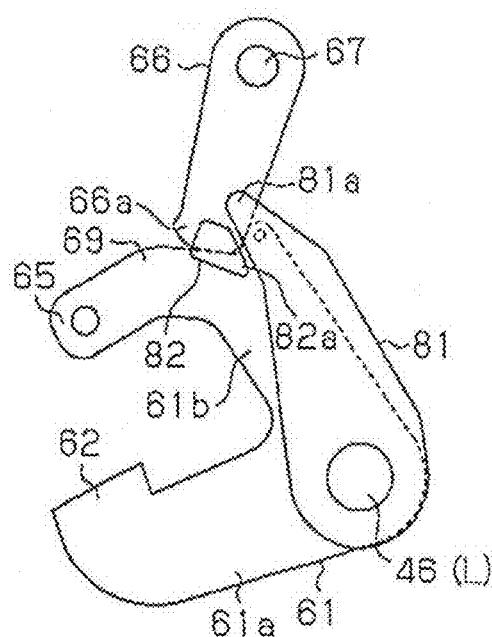
FIG. 10B is another drawing illustrating an operation of the unlocked state retaining lever of the seat slide apparatus for a vehicle according to the first embodiment.

As FIGS. 10A and 10B illustrate, the connecting lever portion 61b of the second unlock lever 61 is formed with a hook-form portion 69, which is a portion bent in a form similar to a hook. The end portion 66a of the unlocked state retaining lever 66 is configured such that the end portion 66a makes contact with the second unlock lever 61 at a portion near the hook-form portion 69.

More specifically, as FIG. 10A illustrates, in a state before the seat back 3 is operated to knock down in the frontward direction and the second unlock lever 61 makes rotational movement, the end portion 66a of the unlocked state retaining lever 66 is in contact with the second unlock lever 61 at a position closer to the distal end of the connecting lever portion 61b relative to the hook-form portion 69, which is a position closer to the connecting portion 65 relative to the hook-form portion 69. Furthermore, as FIG. 10B illustrates, in a state in which the second unlock lever 61 is rotated to a position that makes the lock mechanism 40 unlock, the end portion 66a of the unlocked state retaining lever 66 is configured to be in contact with the second unlock lever 61 at a position closer to the proximal end of the connecting lever portion 61b relative to the hook-form portion 69, which is a position closer to the center of rotational movement L relative to the hook-form portion 69.

More specifically, in a state in which the unlocked state retaining lever 66 rotationally moves in conjunction with movement of the second unlock lever 61, a contact point of the unlocked state retaining lever 66 on the second unlock lever 61 seemingly moves on an outer peripheral portion of the connecting lever portion 61b from a position in the direction of the distal end to a position in the direction of the proximal end.

In the seat slide apparatus for a vehicle according to the first embodiment, the hook-form portion 69 and the end portion 66a of the unlocked state retaining lever 66 are configured such that the end portion 66a engages with the hook-form portion 69 in a state in which a contact point between the unlocked state retaining lever 66 and the second unlock lever 61 moves closer to the proximal end of the connecting lever portion 61b relative to the hook-form portion 69. Accordingly, rotational movement of the second unlock lever 61 is restrained and the lock mechanism 40 may be retained in the unlocked state in which the lock mechanism 40 is unlocked.

Furthermore, the unlocked state retaining mechanism 60 includes an unlocked state release lever 71, which serves as a first unlocked state release mechanism. The unlocked state release lever 71 is configured to release the lock mechanism 40 from the state in which the lock mechanism 40 is retained in the unlocked state, which is retained by an operation of the unlocked state retaining lever 66, in accordance with movement of the upper rail 21 relative to the lower rail 5.

As FIGS. 8 and 9 illustrate, the unlocked state release fever 71 includes a rotation shaft 72 extending in an upward-downward direction arranged skew to the rotation shaft 67 of the unlocked state retaining lever 66. Note that, the upward-downward direction refers to an upward-downward direction in FIGS. 8 and 9. Furthermore, the unlocked state release lever 71 includes an action bar 71a and an operation bar 71b extending straight in opposite directions relative to the rotation shaft 72, which is a proximal end for each of the action bar 71a and the operation bar 71b.

More specifically, each of the action bar 71a and the operation bar 71b is formed in a form similar to an elongated plate. A helical torsion spring 73 fits to the rotation shaft 72. The helical torsion spring 73 biases the unlocked state release lever 71 such that the action bar 71a of the unlocked state release lever 71 makes contact with the end portion 66a of the unlocked state retaining lever 66 from the vehicle frontward direction, which is from right in FIG. 9.

Furthermore, at a distal end of the operation bar 71b, a rotation operation portion 74, which serves as a first end, is attached. The rotation operation portion 74 is formed in a cube form and is formed by resin or a similar material. The unlocked state release lever 71 of the seat slide apparatus for a vehicle according to the first embodiment is configured to rotationally move in a direction in accordance with a direction in which an operation body makes contact with the rotation operation portion 74. Note that, the unlocked state release lever 71, the rotation shaft 72, the helical torsion spring 73, and the rotation operation portion 74 serve as a first unlocked state release mechanism.

Figure 11:
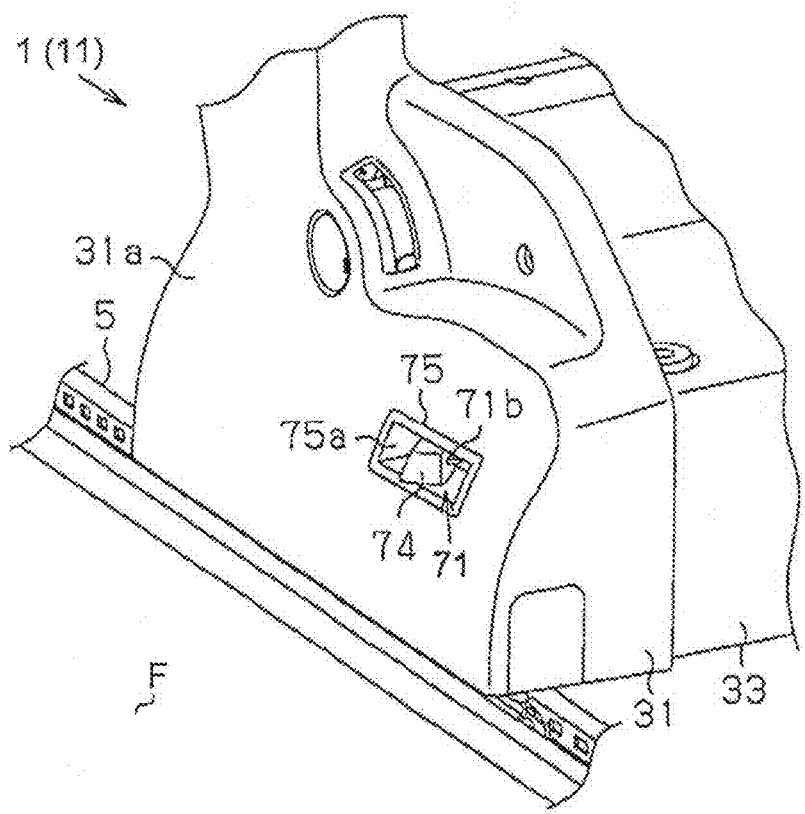
FIG. 11 is a perspective view drawing illustrating a side surface of a seat of the seat slide apparatus for a vehicle according to the first embodiment.

As FIG. 11 illustrates, a housing cover 75 is provided on the side shield 31 that surrounds the side frame 23 and the unlocked state retaining mechanism 60 from the outward direction. The housing cover 75 is configured to contain the rotation operation portion 74 that is arranged at the distal end of the operation bar 71b. The housing cover 75 is formed such that the housing cover 75 does not restrain rotational movement of the rotation operation portion 74. Furthermore, the housing cover 75 includes an opening portion 75a on a side surface 31a of the side shield 31. In the seat slide apparatus for a vehicle according to the first embodiment, the rotation operation portion 74 that is arranged at the distal end of the operation bar 71b is configured to protrude from the opening portion 75a of the housing cover 75 to protrude in the side direction of the side shield 31 in accordance with rotational movement of the unlocked state release lever 71.

Figure 12:
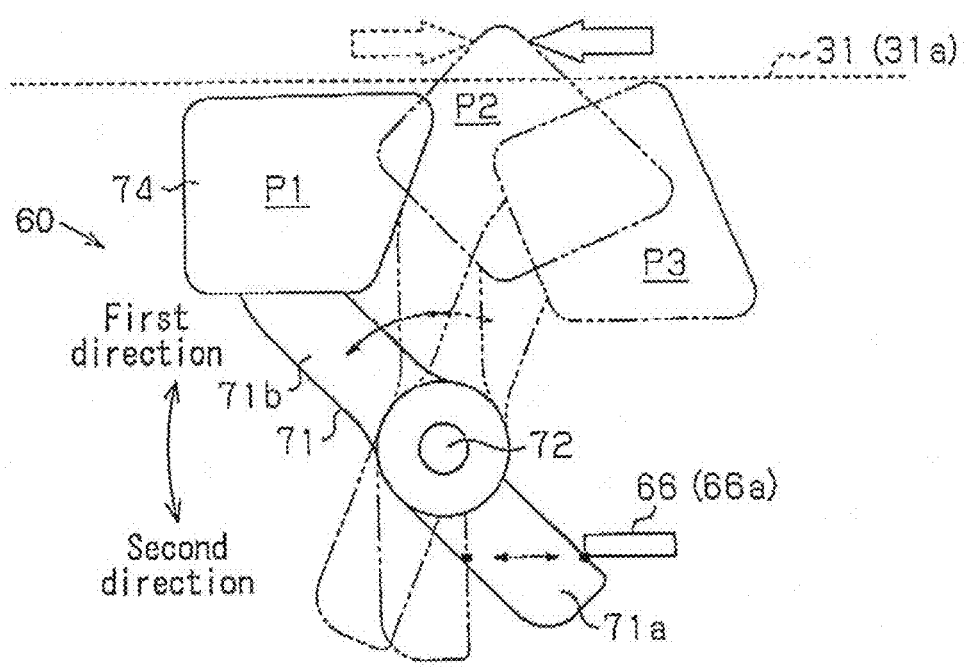
FIG. 12 is a drawing illustrating an operation of an unlocked state release lever of the seat slide apparatus for a vehicle according to the first embodiment.

More specifically, as FIG. 12 illustrates, a contact point between the unlocked state retaining lever 66 and the action bar 71a of the unlocked state release lever 71 moves in the vehicle frontward-rearward direction, which is a leftward-rightward direction in FIG. 12, in accordance with rotational movement of the unlocked state retaining lever 66.

More specifically, the end portion 66a of the unlocked state retaining lever 66 that is in contact with the second unlock lever 61 moves toward the vehicle frontward direction, which is leftward in FIG. 12, in conjunction with rotational movement of the second unlock lever 61 as illustrated in FIGS. 10A, 10B. Furthermore, the unlocked state release lever 71 is biased by the helical torsion spring 73 so that the action bar 71a of the unlocked state release lever 71 makes contact with the end portion 66a of the unlocked state retaining lever 66 from the vehicle frontward direction.

As a result, by the end portion 66a of the unlocked state retaining lever 66 moving in the vehicle frontward direction, the action bar 71a, which is the contact point between the unlocked state retaining lever 66 and the unlocked state release lever 71, makes rotational movement in a direction in which the action bar 71a of the unlocked state release lever 71 moves in the vehicle frontward direction, which is the clockwise direction in FIG. 12.

More specifically, in the seat slide apparatus for a vehicle according to the first embodiment, the rotational direction the action bar 71a moves toward the vehicle frontward direction is referred to as a first direction of the rotational movement of the unlocked state release lever 71. The rotational direction in the opposite direction relative to the first direction is referred to as a second direction of the rotational movement of the unlocked state release lever 71.

The unlocked state release lever 71 of the seat slide apparatus for a vehicle according to the first embodiment is configured such that an entire portion of the rotation operation portion 74, which is arranged on the operation bar 71b, is contained in the housing cover 75 in a state in which the rotation operation portion 74 is at a rotational position P1. The rotational position P1 corresponds to a state before the unlocked state release lever 71 rotationally moves in the first direction, which is a state before the unlocked state retaining lever 66 moves in conjunction with the second unlock lever 61 to a position where the lock mechanism 40 is retained in the unlocked state. In a state in which the unlocked state release lever 71 rotationally moves in conjunction with the movement of the unlocked state retaining lever 66 that is in contact with the unlocked state release lever 71, the rotation operation portion 74 protrudes from the opening portion 75a of the housing cover 75 to protrude in the side direction of the side shield 31.

More specifically, the unlocked state release lever 71 of the seat slide apparatus for a vehicle according to the first embodiment is configured such that an operation body may not contact with the rotation operation portion 74 of the unlocked state release lever 71 in a state before which the lock mechanism 40 is operated into the unlocked state by operating a walk-in function that is operated by an operation to knock down the seat back 3 in the frontward direction.

The unlocked state release lever 71 rotationally moves in the first direction in conjunction with the unlocked state retaining lever 66 moving to the position where the lock mechanism 40 is retained in the unlocked state. As a result, the rotation operation portion 74 is exposed to a portion outside of the housing cover 75. Accordingly, an operation body is allowed to make contact with the rotation operation portion 74 of the unlocked state release lever 71 of the seat slide apparatus for a vehicle according to the first embodiment. The operation body is allowed to make contact with the rotation operation portion 74 in the vehicle frontward-rearward direction, which is the direction that conforms to the direction of movement of the seat 11, which in other words is the direction that conforms to the direction of the movement of the upper rail 21 relative to the lower rail 5.

More specifically, with an operation to unlock the lock mechanism 40 in accordance with an operation of the walk-in function, the unlocked state release lever 71 rotationally moves in the first direction to a rotational position P2 that corresponds to a state in which the unlocked state retaining lever 66 has moved to the position where the lock mechanism 40 is retained in the unlocked state.

At this time, in a case where an operation body makes contact with the rotation operation portion 74 protruding from the opening portion 75a of the housing cover 75 from the vehicle rearward direction, which is rightward in FIG. 12, the unlocked state release lever 71 makes rotational movement in the second direction, which is the direction in which the action bar 71a moves in the vehicle rearward direction. Note that, the action bar 71a serves as the second end. Accordingly, the unlocked state retaining mechanism 60 of the seat slide apparatus for a vehicle according to the first embodiment releases the lock mechanism 40 from a state in which the lock mechanism 40 is retained in the unlocked state in accordance with the rotational movement of the unlocked state release lever 71 in the second direction.

Furthermore, by the unlocked state release lever 71 making the rotational movement in the second direction, the unlocked state retaining lever 66 is pushed in the vehicle rearward direction by the action bar 71a that is in contact with the unlocked state retaining lever 66. In accordance with a force that pushes the unlocked state retaining lever 66, the unlocked state retaining lever 66 makes rotational movement. Accordingly, an engagement between the end portion 66a of the unlocked state retaining lever 66 and the hook-form portion 69 of the second unlock lever 61 is disengaged so that the lock mechanism 40 returns to the state in which the lock mechanism 40 is locked.

Furthermore, in the seat slide apparatus for a vehicle according to the first embodiment, in a state in which an input by an outside force that is against the elastic force of the helical torsion spring 73 is provided on the rotation operation portion 74 of the unlocked state release lever 71, the unlocked state release lever 71 is configured to rotationally move in the first direction to a position farther in the first direction relative to the rotational position P2 corresponding to the state in which the unlocked state retaining lever 66 has moved to the position where the lock mechanism 40 is retained in the unlocked state. Note that, an operation body making contact is an example of the input by an outside force.

More specifically, the unlocked state release lever 71 rotationally moves in the first direction so that the rotation operation portion 74 arranged at the distal end of the operation bar 71b is entirely contained in the housing cover 75. At this time, the action bar 71a of the unlocked state release lever 71 is separated from the unlocked state retaining lever 66. Even in the state in which the action bar 71a is separated from the unlocked state retaining lever 66, the unlocked state retaining lever 66 remains in the state in which the end portion 66a of the unlocked state retaining lever 66 and the hook-form portion 69 of the second unlock lever 61 are engaged. In other words, the unlocked state retaining lever 66 is still at the position that may retain the lock mechanism 40 in the unlocked state, as FIG. 10B illustrates. Accordingly, while retaining the lock mechanism 40 in the unlocked state, the unlocked state retaining mechanism 60 of the seat slide apparatus for a vehicle according to the first embodiment allows the unlocked state release lever 71 to rotationally move in the first direction to a rotational position P3 at which an operation of the rotation operation portion 74 by a contact of the operation body is restrained.

Figure 13:
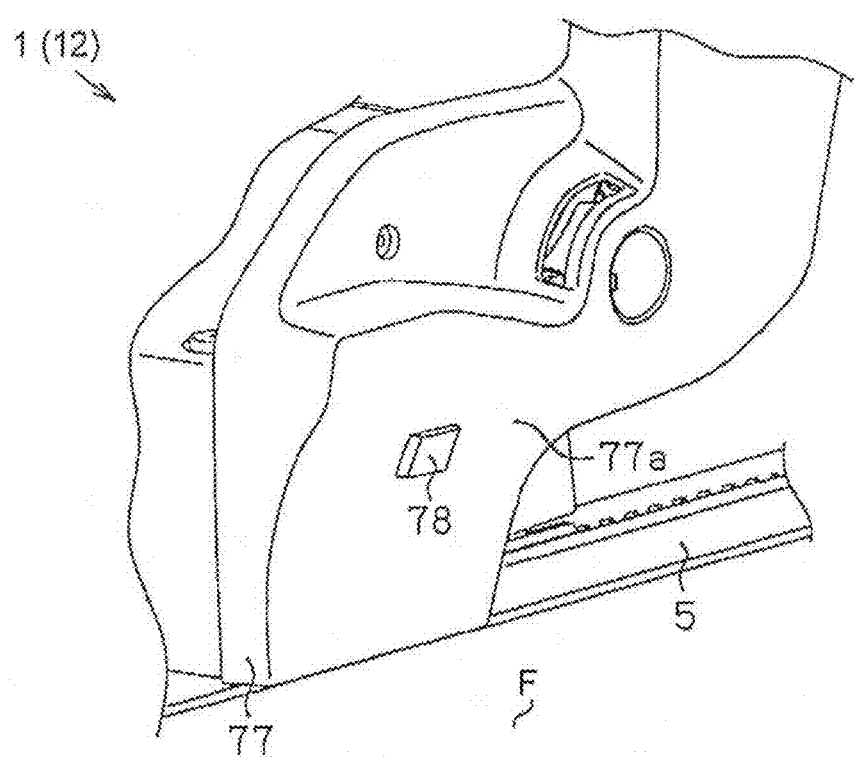
FIG. 13 is a perspective drawing illustrating a side surface of a seat adjacent to the seat of the seat slide apparatus for a vehicle according to the first embodiment.

As FIGS. 1 and 13 illustrate, in the seat slide apparatus for a vehicle according to the first embodiment, on a side shield 77 of the seat 12, which is the seat adjacent to the seat 11, an operation protrusion 78 protrudes in a direction toward the side shield 31 of the seat 11 from a side surface 77a of the side shield 77.

More specifically, the operation protrusion 76 is arranged at a position that corresponds to the opening portion 75a of the housing cover 75 provided on the side surface 31a of the side shield 31. To be more specific, the operation protrusion 78 is arranged at a position having same height in a seat height direction as the opening portion 75a. Note that, the seat height direction refers to an upward-downward direction in FIG. 2. Furthermore, the operation protrusion 78 is arranged at a position that is displaced slightly in the vehicle frontward direction relative to the opening portion 75a of the seat 11 in a state in which the seat 11 and the seat 12 arranged side by side are at positions aligned in the vehicle frontward-rearward direction.

More specifically, the unlocked state retaining mechanism 60 of the seat slide apparatus for a vehicle according to the first embodiment is configured such that the operation protrusion 78, which serves as an operation body, makes contact with the rotation operation portion 74 in accordance with displacement of the seat 11 in the vehicle frontward-rearward direction. Accordingly, the unlocked state release lever 71 rotationally moves in the second direction so that the lock mechanism 40 is released from the state in which the lock mechanism 40 is retained in the unlocked state.

Furthermore, as FIGS. 8 and 9 illustrate, on the rotation shaft 46 of the unlock lever 50, a second unlocked state release lever 81 is arranged. The second unlocked state release lever 81 makes rotational movement integrally with the rotation shaft 46 in accordance with the operational input at the operation lever 48. In the seat slide apparatus for a vehicle according to the first embodiment, the second unlocked state release lever 81, which serves as a second unlocked state release mechanism, is configured to push the unlocked state retaining lever 66 to move the unlocked state retaining lever 66 to a position where the lock mechanism 40 is released from the state in which the lock mechanism 40 is retained in the unlocked state.

More specifically, the second unlocked state release lever 81 of the seat slide apparatus according to the first embodiment is formed in a form similar to an elongated plate. With a portion that is retained at the rotation shaft 46 as a proximal end, the second unlocked state release lever 81 extends in an upward direction toward a distal end 81a. Furthermore, the second unlocked state release lever 81 is retained at a position at which the second unlock lever 61 is sandwiched between the second unlocked state release lever 81 and the unlock lever 50 on an axis of the rotation shaft 46. The second unlocked state release lever 81 is retained at a position that is outward relative to the unlock lever 50 in a width direction of the vehicle seat 1, which is toward a viewer of FIG. 9 in a perpendicular direction relative to the surface where FIG. 9 is drawn. Accordingly, the second unlocked state release lever 81 is configured to make rotational movement integrally with the unlock lever 50 with the rotation shaft 46 as the center of the rotational movement.

Furthermore, a protruding portion to be pushed 82 is arranged at the end portion 66a of the unlocked state retaining lever 66. The protruding portion to be pushed 82 is pushed by the distal end 81a of the second unlocked state release lever 81 by the rotational movement of the second unlocked state release lever 81 in accordance with the operational input at the operation lever 48. Note that, the second unlocked state release lever 81 and the protruding portion to be pushed 82 serve as a second unlocked state release mechanism. More specifically, the protruding portion to be pushed 82 is formed in a form similar to a flat plate and is retained at a flat surface portion 66b of the unlocked state retaining lever 66, which is the surface in the outward direction in the width direction of the vehicle seat 1. Note that, the outward direction in the width direction of the vehicle seat 1 refers to the direction toward the viewer of FIG. 9 in the perpendicular direction relative to the surface where FIG. 9 is drawn. Furthermore, the protruding portion to be pushed 82 includes an end portion 82a protruding from the end portion 66a of the unlocked state retaining lever 66 in a direction that conforms to the direction in which the unlocked state retaining lever 66 is biased, which is the counterclockwise direction in FIG. 9. In the seat slide apparatus for a vehicle according to the first embodiment, the end portion 82a mainly is the portion at which the distal end 81a of the second unlocked state release lever 81 pushes.

As FIG. 10A illustrates, the second unlocked state release lever 81 is configured to remain at a position at which the second unlocked state release lever 81 does not interfere with the unlocked state retaining lever 66 even at a time of the operational input at the operation lever 48 in a state before the second unlock lever 61 rotationally moves in response to the operation to knock down the seat back 3 in the frontward direction, which is in a state where the second unlock lever 61 is at a position at which the second unlock lever 61 is not pushing the unlock lever 50.

Figure 14:
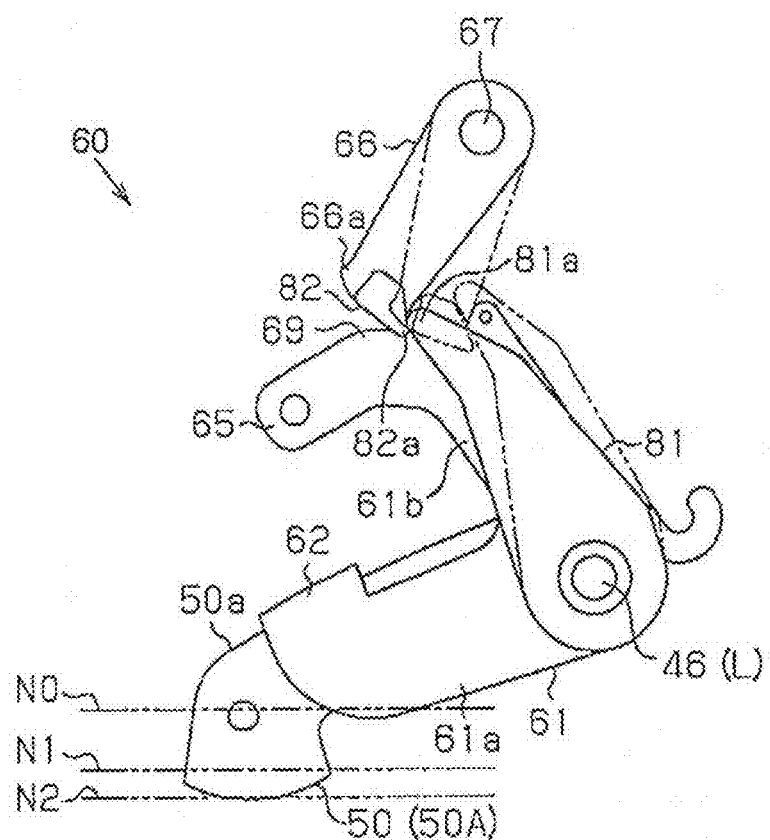
FIG. 14 is a drawing illustrating an operation of a second unlocked state release lever of the seat slide apparatus for a vehicle according to the first embodiment.

More specifically, as FIG. 14 illustrates, in the seat slide apparatus for a vehicle according to the first embodiment, the second unlocked state release lever 81 pushes the protruding portion to be pushed 82 on condition that the lock mechanism 40 is retained in the unlocked state by the unlocked state retaining lever 66 and, additionally, the rotation shaft 46 and the unlock lever 50 are further rotated by an operational input at the operation lever 48 into a full stroke state. Note that, the rotational movement for the full stroke state is in the counterclockwise direction in FIG. 14. A two-dot chain line N0 in FIG. 14 indicates a position of an end portion of the unlock lever 50 at a time at which the lock mechanism 40 is in the locked state, which is the state in which the lock mechanism 40 is locked, and the operation lever 48 is not operated. A two-dot chain line N1 in FIG. 14 indicates the position of the end portion of the unlock lever 50 at a time at which the lock mechanism 40 is retained in the unlocked state and the operation lever 48 is not operated. Furthermore the two-dot chain line N2 in FIG. 14 indicates the position of the end portion of the unlock lever 50 at a time at which the unlock lever 50 is operated into the full stroke state by the operational input at the operation lever 48. In the first embodiment, by operating the unlock lever 50 into the full stroke state, the unlocked state retaining lever 66 makes rotational movement in a direction that disengages the unlocked state retaining lever 66 and the second unlock lever 61, which is the clockwise direction in FIG. 14, so that the lock mechanism 40 may be released from the state in which the lock mechanism 40 is retained in the unlocked state.

Figure 15A:
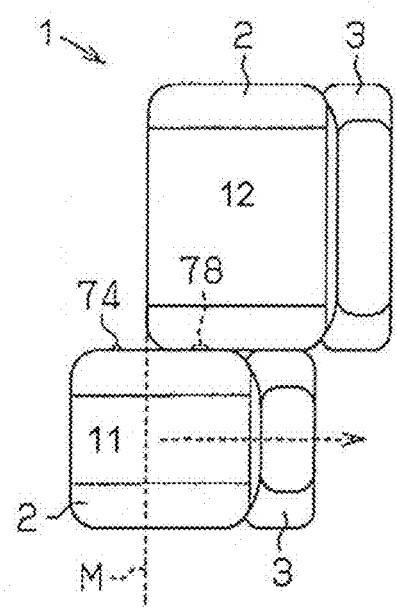
FIG. 15A is a drawing illustrating an operation of the unlocked state retaining mechanism of the seat slide apparatus for a vehicle according to the first embodiment.

Operations of the unlocked state retaining mechanism 60 of the seat slide apparatus for a vehicle according to the first embodiment provided with the aforementioned configuration will be described next. As FIG. 15A illustrates, the seat 11, which is retained in the state in which the lock mechanism 40 is unlocked by operating the walk-in function, is operated to move in the vehicle frontward direction, which is toward left in FIG. 15A. Afterwards, in many cases, the seat 11 is returned to a position that arranges the seat 11 and the seat 12, which is the seat adjacent to the seat 11, to be positioned side by side. More specifically, the seat 11 is returned to the position at which the edges of the seat 11 and the seat 12 in the vehicle frontward-rearward direction are aligned at a broken line M in FIG. 15A.

In the seat slide apparatus for a vehicle according to the first embodiment, a seat sliding operation at this time makes the rotation operation portion 74 that is protruding from a side of the seat 11 to contact with the operation protrusion 78 that is arranged on the seat 12, which is the seat that is adjacent to the seat 11. More specifically, at a time at which the seat 11 is displaced in the vehicle rearward direction, the rotation operation portion 74 of the seat 11 makes contact with the operation protrusion 78 that is arranged on the seat 12. Relative to the rotation operation portion 74 of the seat 11 making contact with the operation protrusion 78, the unlocked state release lever 71 is operated to rotationally move in the second direction, which is a rotational operation illustrated with a solid line arrow in FIG. 12. Accordingly, the operation to move the unlocked state release lever 71 rotationally in the second direction releases the lock mechanism 40 from the state in which the lock mechanism 40 is retained in the unlocked state and the seat 11 is retained at a position at which the seat 11 and the seat 12 are aligned side by side.

Figure 15B:
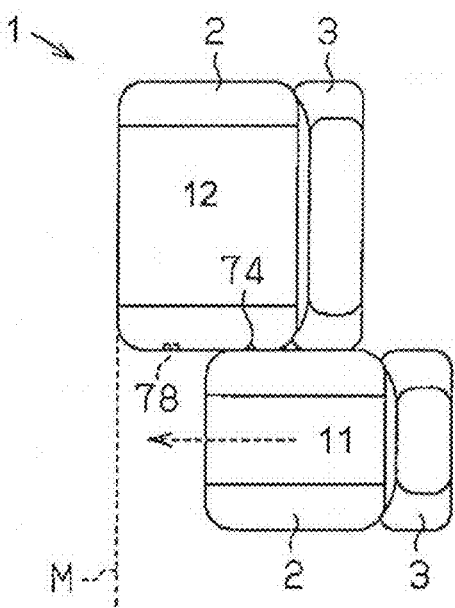
FIG. 15B is another drawing illustrating an operation of the unlocked state retaining mechanism of the seat slide apparatus for a vehicle according to the first embodiment.

Furthermore, as FIG. 15B illustrates, at a time at which the walk-in function is operated, the seat 11 may be at a position in the vehicle rearward direction, which is rightward in FIG. 15B. In such case the rotation operation portion 74 that is protruding from the side of the seat 11 makes contact with the operation protrusion 78 that is arranged on the seat 12, which is the seat that is adjacent to the seat 11, from the vehicle rearward direction by a seat sliding operation of the seat 11 in the vehicle frontward direction.

Accordingly, in the seat slide apparatus for a vehicle according to the first embodiment, the unlocked state release lever 71 makes further rotational movement in the first direction, which is a rotational operation illustrated with a broken line arrow in FIG. 12. Note that, the rotational movement in the first direction is in the clockwise direction in FIG. 15B. The unlocked state release lever 71 makes rotational movement to a position at which the unlocked state release lever 71 is restrained from a rotational operation in response to the rotation operation portion 74 making contact with the operation protrusion 78, which is the rotational position P3 illustrated in FIG. 12. Without the rotation operation portion 74 interfering with the operation protrusion 78 that is on the seat 12, the seat 11 may be smoothly displaced in the vehicle frontward direction.

Furthermore, in the seat slide apparatus for a vehicle according to the first embodiment, by an operation of the operation lever 48 by an operator, the second unlocked state release lever 81 that makes rotational movement integrally with the unlock lever 50 pushes the unlocked state retaining lever 66 even at a time after which the walk-in function is operated and the seat 11 has moved in the vehicle frontward direction and before which the seat 11 is moved in the rearward direction from the vehicle frontward direction to the position at which the seat 11 and the seat 12, which is the seat adjacent to the seat 11, are aligned side by side. Accordingly, the unlocked state retaining lever 66 rotationally moves in a direction that releases the lock mechanism 40 from the state in which the lock mechanism 40 is retained in the unlocked state so that the seat 11 may be retained at a selected position during a sliding movement.

The seat slide apparatus for a vehicle according to the first embodiment is advantageous in following aspects. First, the unlocked state retaining mechanism 60 includes the second unlock lever 61. The second unlock lever 61 pushes the unlock lever 50 in response to an operation to knock down the seat back 3 in the frontward direction to operate the lock mechanism 40 make rotational movement in the direction that unlocks the lock mechanism 40. Furthermore, the unlocked state retaining mechanism 60 includes the unlocked state retaining lever 66. The unlocked state retaining lever 66 is configured to rotationally move in conjunction with movement of the second unlock lever 61 to the position at which the lock mechanism 40 is retained in the unlocked state and cooperates with the second unlock lever 61 to retain the lock mechanism 40 in the unlocked state. Furthermore, the unlocked state retaining mechanism 60 includes the unlocked state release lever 71. The unlocked state release lever 71 makes rotational movement by the rotation operation portion 74 of the unlocked state release lever 71 coming into contact with the operation protrusion 78 in accordance with movement of the upper rail 21 relative to the lower rail 5. Note that, the rotation operation portion 74 serves as the first end. Accordingly, the action bar 71a of the unlocked state release lever 71 pushes the unlocked state retaining lever 66 in the direction that releases the lock mechanism 40 from the state in which the lock mechanism 40 is retained in the unlocked state. Note that, the action bar 71a serves as the second end. Furthermore, the unlocked state retaining mechanism 60 includes the second unlocked state release lever 81. The second unlocked state release lever 81 makes rotational movement integrally with the unlock lever 50 in response to the operational input at the operation lever 48 and pushes the unlocked state retaining lever 66 in the direction that releases the lock mechanism 40 from retained in the unlocked state.

Upon the above-mentioned configuration, the lock mechanism 40 may be released from the state in which the lock mechanism 40 is retained in the unlocked state at a selected position during sliding movement even at a time before which the unlocked state release lever 71 makes contact with the operation protrusion 78 in accordance with movement of the upper rail 21 relative to the lower rail 5 and the unlocked state release lever 71 pushes the unlocked state retaining lever 66 in the direction that releases the lock mechanism 40 from the state in which the lock mechanism 40 is retained in the unlocked state. As a result, a seat position may be adjusted with easier operation and with more convenience.

Second, the second unlocked state release lever 81 is arranged to remain at a position that does not interfere with the unlocked state retaining lever 66 or with the protruding portion to be pushed 82 even at a time of the operational input at the operation lever 48 in a state where the second unlock lever 61 is not pushing the unlock lever 50.

Upon the above-mentioned configuration, at a time at which the lock mechanism 40 is unlocked by an operation at the operation lever 48 in a normal seat sliding operation, the unlocked state retaining lever 66 does not make rotational movement. As a result, a false operation may be prevented to secure high reliability of the seat sliding operation. Furthermore, a noise that is generated by the second unlocked state release lever 81 making contact with the unlocked state retaining lever 66 may be prevented so that the seat slide apparatus may be operated with an operational noise kept at a low level.

Figure 16:
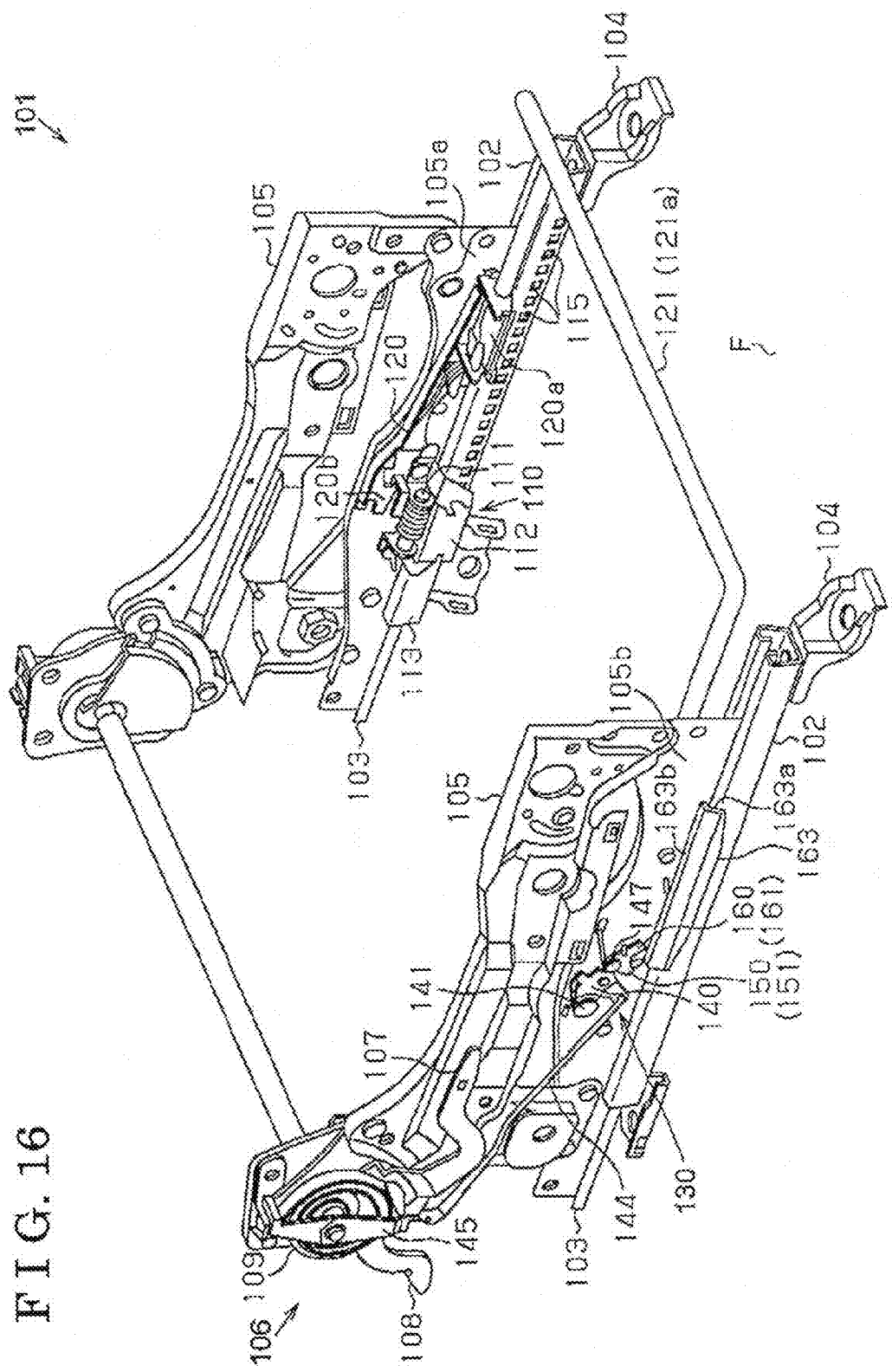
FIG. 16 is a perspective view drawing illustrating a seat slide device of the seat slide apparatus for a vehicle according to a second embodiment.

The seat slide apparatus for a vehicle according to a second embodiment will be described next referring to drawings. As FIG. 16 illustrates, the seat slide device 101 of the second embodiment includes two lower rails 102 extending parallel to each other in the vehicle frontward-rearward direction and upper rails 103 arranged to move relative to the lower rails 102 in an elongating direction of the lower rails 102 on the lower rails 102, similarly to the seat slide device 20 of the seat slide apparatus for a vehicle according to the first embodiment. A seat is retained on the upper rails 103 such that a position of the seat in the vehicle frontward-rearward direction may be adjusted.

In the seat slide apparatus for a vehicle according to the second embodiment, each of the lower rails 102 is retained on the floor portion F of the vehicle via a base bracket 104. Furthermore, a side frame 105 that forms a framework of a seat cushion is arranged on each of the upper rails 103.

Figure 17:
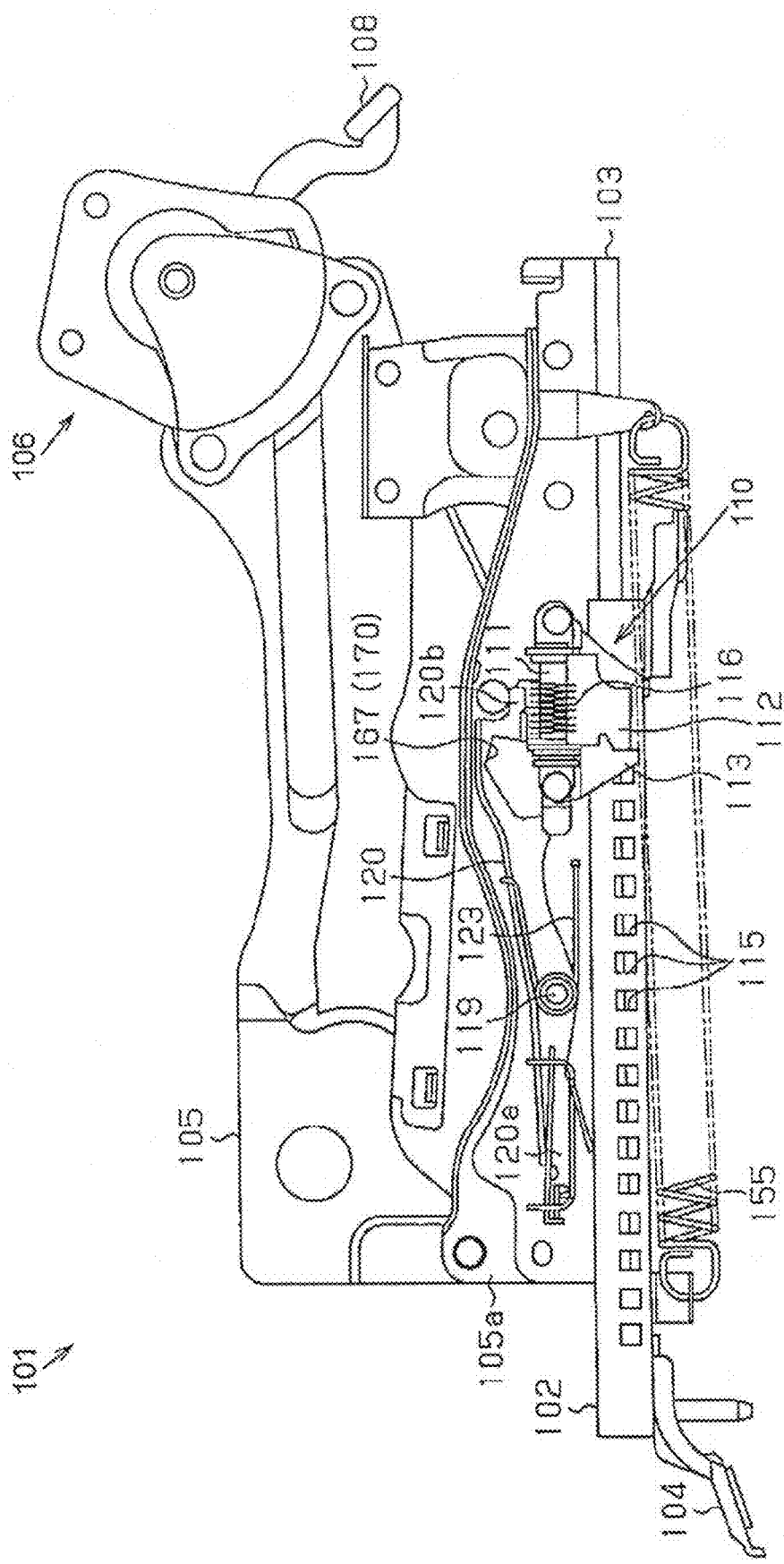
FIG. 17 is a side view drawing illustrating the seat slide device of the seat slide apparatus for a vehicle according to the second embodiment viewing an inner side surface of the seat slide device.
Figure 18:
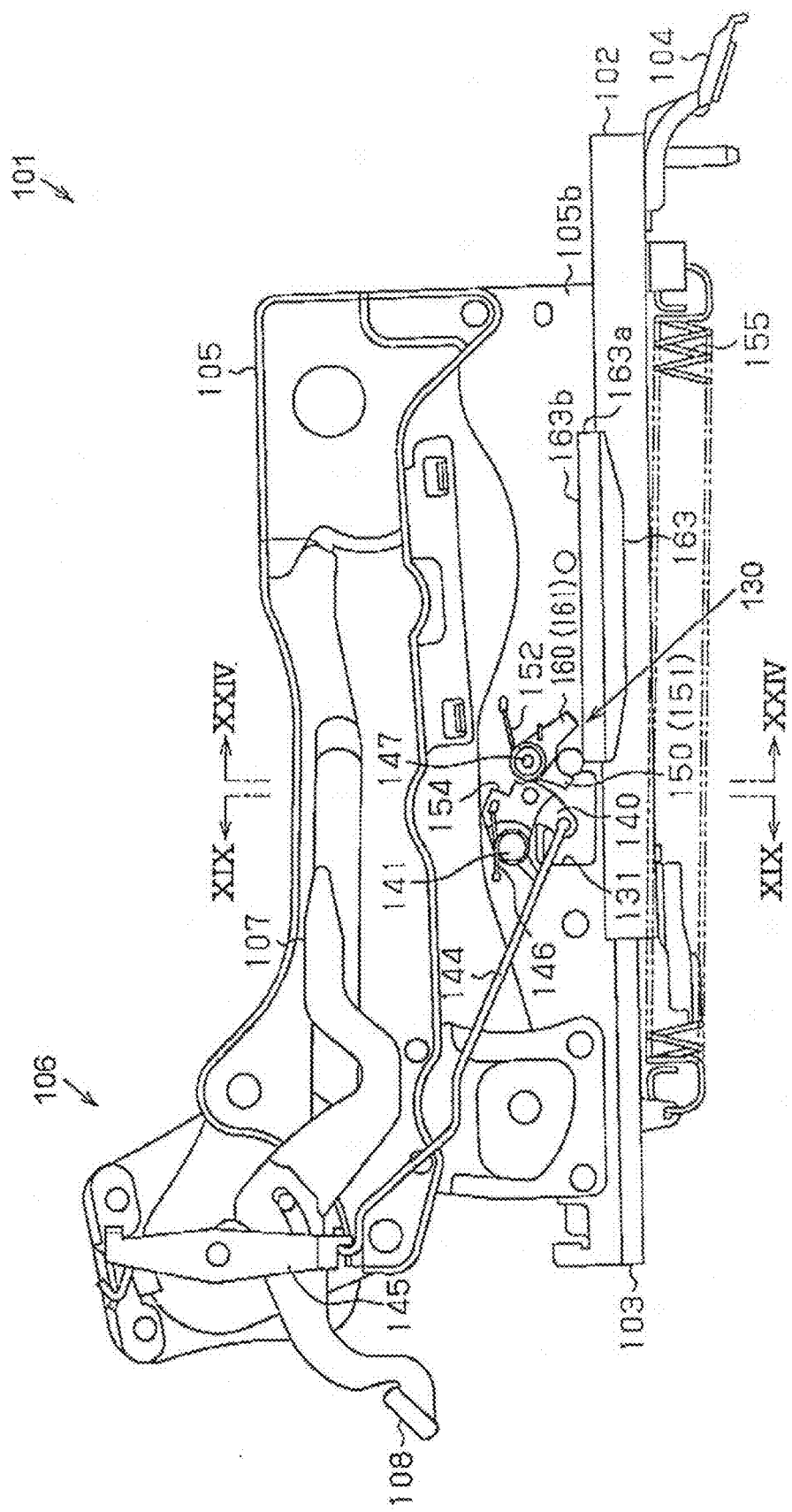
FIG. 18 is a side view drawing illustrating the seat slide device of the seat slide apparatus for a vehicle according to the second embodiment viewing an outer side surface of the seat slide device.

More specifically, as FIGS. 16 to 18 illustrate, the side frame 105 of the seat slide apparatus for a vehicle according to the second embodiment, is formed in a flat plate form having a form similar to a rectangle. The side frame 105 erects on the upper rail 103 such that a longitudinal direction of the side frame 105 conforms to an elongating direction of the upper rail 103 and the elongating direction of the lower rail 102. Note that the elongating direction refers to a leftward-rightward direction in FIGS. 17 and 18.

Figure 19:
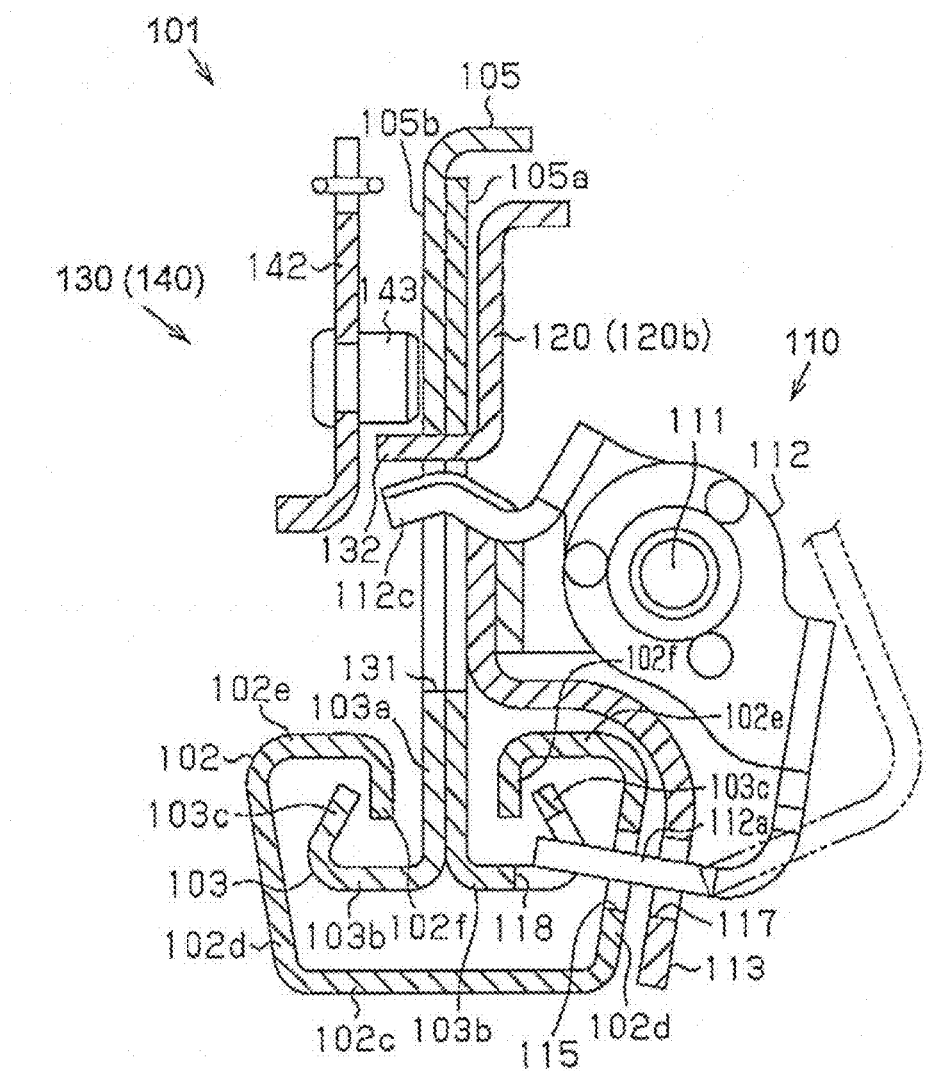
FIG. 19 is a cross-sectional view drawing taken along XIX-XIX in FIG. 18 illustrating a general configuration of a lock mechanism of the seat slide apparatus for a vehicle according to the second embodiment.

As FIG. 19 illustrates, a form of the lower rail 102 of the seat slide apparatus for a vehicle according to the second embodiment is similar to the form of the lower rail 5 of the seat slide apparatus for a vehicle according to the first embodiment. Accordingly, the lower rail 102 includes a bottom wall 102c, outer walls 102d, top walls 102e, and inner walls 102f. On the other hand, the upper rail 103 includes a body portion 103a that is integrally formed with the side frame 105. In the second embodiment, similarly to the upper rail 21 of the first embodiment, a pair of protruding portions 103b and hook portions 103c are arranged at a bottom end of the body portion 103a, which is an end portion in a downward direction in FIG. 19. Each of the protruding portions 103b is a portion that is folded outwardly in a width direction at the bottom end of the body portion 103a. Note that the width direction refers to a leftward-rightward direction in FIG. 19. Each of the hook portions 103c is a portion that is folded upwardly from each end of the protruding portions 103b.

More specifically, the upper rail 103 of the seat slide apparatus for a vehicle according to the second embodiment attaches to the lower rail 102 so that the body portion 103a is arranged between the inner walls 102f of the lower rail 102. Furthermore, similarly to the seat slide apparatus for a vehicle according to the first embodiment, by arranging each of the protruding portions 103b and each of the hook portions 103c in a space surrounded by the outer wall 102d of the lower rail 102, the top wall 102e of the lower rail 102, and the inner wall 102f of the lower rail 102, the upper rail 103 is restrained from movement in an upward direction relative to the lower rail 102 and is restrained from movement in the width direction relative to the lower rail 102.

Note that, in the seat slide apparatus for a vehicle according to the second embodiment, instead of having wheels 22 of the seat slide apparatus for a vehicle according to the first embodiment, a multiple number of rolling elements are arranged between the lower rail 102 and the upper rail 103. Rolling of the rolling elements secures smooth relative movement between the lower rail 102 and the upper rail 103.

As FIGS. 16 to 18 illustrate, a known type of seat reclining device 106 is arranged at a rearward end portion of the side frame 105, which is a leftward end portion in FIG. 18, similarly to the seat slide apparatus for a vehicle according to the first embodiment. A seat back is linked to the seat cushion via the seat reclining device 106 so that a state of the seat back may be switched between a state in which rotational movement relative to the seat cushion is restrained and a state in which the rotational movement relative to the seat cushion is allowed.

More specifically, the seat reclining device 106 includes an operation lever 107 protruding in a side direction of the side frame 105. The operation lever 107 is manually operated. The seat reclining device 106 furthermore includes a foot-operated lever 108 protruding in a rearward direction of the side frame 105. Furthermore, the seat back is biased by an elastic force of a spiral spring 109, which is illustrated in FIG. 16. The seat back is biased in a direction that makes the seat back tilt in a vehicle frontward direction, which is rightward in FIG. 18. In other words, in accordance with the elastic force of the spiral spring 109, the seat back is biased in a direction that knocks down the seat back in a frontward direction. Similarly to the seat reclining device 35 of the seat slide apparatus for a vehicle according to the first embodiment, the seat reclining device 106 of the seat slide apparatus for a vehicle according to the second embodiment is configured such that a tilting angle of the seat back may be adjusted with an operation of the operation lever 107 and the seat back may be knocked down in the vehicle frontward direction by operating the foot-operated lever 108.

Furthermore, as FIG. 19 illustrates, similarly to the seat slide apparatus for a vehicle according to the first embodiment, the seat slide device 101 includes a lock mechanism 110 configured to restrain movement of the upper rail 103 relative to the lower rail 102.

More specifically, the lock mechanism 110 of the seat slide apparatus for a vehicle according to the second embodiment includes a lock lever 112 having a rotation shaft 111 that conforms to an elongating direction of the lock lever 112 and retained to the upper rail 103 in a state such that the lock lever 112 may rotationally move at the rotation shaft 111. Note that, the elongating direction of the lock lever 112 refers to a perpendicular direction relative to the surface where FIG. 19 is drawn. As FIGS. 16 and 17 illustrate, in the second embodiment, the lock lever 112 is arranged on an inner surface 105a of the side frame 105. Furthermore, as FIG. 19 illustrates, at one end of the lock lever 112, which is an end portion arranged in the downward direction in FIG. 19, locking protrusions 112a configured to engage with locking through-holes 115 on the lower rail 102 are formed, similarly to the lock lever 41 of the seat slide apparatus for a vehicle according to the first embodiment.

More specifically, as FIG. 17 illustrates, in the seat slide apparatus for a vehicle according to the second embodiment, a spring member 116, which is a helical torsion spring, is arranged to fit to the rotation shaft 111 of the lock lever 112. Accordingly, as FIG. 19 illustrates, an elastic force of the spring member 116 rotationally biases the lock lever 112 in a direction that makes the locking protrusions 112a approach the locking through-holes 115 of the lower rail 102, which is a clockwise direction in FIG. 19.

Furthermore, on a support member 113 of the lock lever 112, which is arranged on the side frame 105, insertion through-holes 117 for receiving the locking protrusions 112a are provided. On the protruding portions 103b and the hook portion 103c of the upper rail 103, which are positioned in the lower rail 102 in the aforementioned arrangement, insertion through-holes 118 for receiving the locking protrusions 112a are provided. Accordingly, the lock mechanism 110 of the seat slide apparatus for a vehicle according to the second embodiment at a normal time is arranged to be in a state in which the locking protrusions 112a of the lock lever 112 and the locking through-holes 115 are engaged. In other words, the lock mechanism 110 at the normal time is in a locked state in which the lock mechanism is locked, which is a state in which the upper rail 103 is restrained from moving relative to the lower rail 102.

Here, as FIGS. 16 and 17 illustrate, in the seat slide apparatus for a vehicle according to the second embodiment, an unlock lever 120 is arranged on the inner surface 105a of the side frame 105. The unlock lever 120 is arranged at a position parallel to the inner surface 105a. The unlock lever 120 is provided with a rotation shaft 119, which is positioned perpendicular to the inner surface 105a. The unlock lever 120 is arranged such that the unlock lever 120 is rotationally supported to the rotation shaft 119. Note that the unlock lever 120 and the rotation shaft 119 serve as a first unlock mechanism. An end portion of a known type of operation lever 121 connects to one end of the unlock lever 120, which is an operating end 120a. Note that, the one end of the unlock lever 120 refers to a leftward end portion in FIG. 17, which in other words is an end portion of the unlock lever 120 in the vehicle frontward direction. The operation lever 121 is formed in a form similar to a U-shape. The operation lever 121 includes an operation portion 121a extending in a width direction of the seat at a position in the frontward direction of the seat. Furthermore, as FIG. 19 illustrates, the other end of the unlock lever 120 is arranged at a position in an upward direction relative to a lever portion 112c. The lever portion 112c is an end portion of the lock lever 112, which is the opposite end relative to the end of the lock lever 112 at which the locking protrusions 112a are arranged.

As FIGS. 16 and 17 illustrate, the unlock lever 120 makes rotational movement in accordance with an operational input at the operation lever 121 that is connected to the operating end 120a of the unlock lever 120. More specifically, the unlock lever 120 is rotationally biased by a spring member 123 arranged to fit to the rotation shaft 119. The spring member 123 is a helical torsion spring. By an elastic force of the spring member 123, the unlock lever 120 is rotationally biased in a direction that makes a pushing end 120b of the unlock lever 120 move in the upward direction, which is a counterclockwise direction in FIG. 17. In a state where an operator operates the operation lever 121, the pushing end 120b makes rotational movement in the downward direction, which is a clockwise direction in FIG. 17.

As FIG. 19 illustrates, the unlock lever 120 of the seat slide apparatus for a vehicle according to the second embodiment is arranged at a position such that the pushing end 120b of the unlock lever 120 pushes the lever portion 112c of the lock lever 112 downwardly, which is in the downward direction in FIG. 19, by the rotational movement in accordance with the operational input at the operation lever 121. More specifically, the lock lever 112 of the second embodiment makes rotational movement in a direction that makes the locking protrusions 112a detach from the locking through-holes 115 on the lower rail 102 in a state where the lever portion 112c of the lock lever 112 is pushed in the downward direction. Note that, the direction that makes the locking protrusions 112a detach from the locking through-holes 115 on the lower rail 102 is the counterclockwise direction in FIG. 19. Accordingly, the locking protrusions 112a and the locking through-holes 115 are disengaged so that the lock mechanism 110 of the second embodiment is operated into an unlocked state in which the lock mechanism 110 is unlocked, which is a state in which movement of the upper rail 103 relative to the lower rail 102 is allowed.

A walk-in function of the seat slide apparatus for a vehicle according to the second embodiment will be described next.

As FIGS. 16 and 18 illustrate, the seat slide device 101 of the seat slide apparatus for a vehicle according to the second embodiment is provided with an unlocked state retaining mechanism 130 similarly to the seat slide apparatus for a vehicle according to the first embodiment. The unlocked state retaining mechanism 130 unlocks the lock mechanism 110 in conjunction with an operation to knock down the seat back in the frontward direction and retains the lock mechanism 110 in the unlocked state.

More specifically, as FIG. 19 illustrates, in the seat slide apparatus for a vehicle according to the second embodiment, the side frame 105 is formed with an insertion through-hole 131 extending through the side frame 105 in a thickness direction at a position corresponding to the rotation shaft 111 of the lock lever 112. Note that, the thickness direction is the leftward-rightward direction in FIG. 19. Furthermore, the lever portion 112c of the lock lever 112 is configured to protrude in a direction of an outer surface 105b of the side frame 105 from the direction of the inner surface 105a of the side frame 105 through the insertion through-hole 131. Note that, the direction of the inner surface 105a is rightward in FIG. 19. FIG. 17 illustrates the inner surface 105a. Furthermore, the direction of the outer surface 105b is leftward in FIG. 19. FIG. 18 illustrates the outer surface 105b.

On the pushing end 120b of the unlock lever 120, a flange 132 is formed. The flange 132 is formed such that the flange 132 protrudes in the direction of the outer surface 105b of the side frame 105 from the direction of the inner surface 105a of the side frame 105 through the insertion through-hole 131, similarly to the lever portion 112c of the lock lever 112. Furthermore, the unlocked state retaining mechanism 130 of the seat slide apparatus for a vehicle according to the second embodiment includes a second unlock lever 140. The second unlock lever 140 operates in conjunction with the operation to knock down the seat back in the frontward direction to push the flange 132 of the unlock lever 120 and the lever portion 112c of the lock lever 112 in the downward direction.

More specifically, as FIGS. 18 and 19 illustrate, the second unlock lever 140 of the seat slide apparatus for a vehicle according to the second embodiment includes a base portion 142. The base portion 142 is arranged at a position parallel to the outer surface 105b of the side frame 105. Furthermore, the base portion 142 is provided with a rotation shaft 141, which is positioned perpendicular to the outer surface 105b. The base portion 142 is arranged such that the base portion 142 is rotationally supported to the rotation shaft 141. As FIG. 19 illustrates, the base portion 142 is provided with a push protrusion 143. The push protrusion 143 protrudes in the direction toward the inner surface 105a at a position in the upward direction relative to the flange 132 of the unlock lever 120. Note that, in the second embodiment, the push protrusion 143 is provided in a state in which the push protrusion 143 penetrates through the base portion 142 in a thickness direction of the base portion 142, which is the leftward-rightward direction in FIG. 19.

Furthermore, as FIG. 18 illustrates, one end of a connecting member 144 connects to the base portion 142, which is a portion of the second unlock lever 140, The connecting member 144 is formed by processing a wire material. The connecting member 144 connects to the base portion 142 at a position in the downward direction relative to the rotation shaft 141. Furthermore, at a rear end portion of the side frame 105, a pulling lever 145 is arranged. The pulling lever 145 makes rotational movement at a time at which the seat back is knocked down in the frontward direction to pull the other end of the connecting member 144 in the rearward direction. Note that the second unlock lever 140, the connecting member 144, and the pulling lever 145 serve as a second unlock mechanism.

Figure 20:
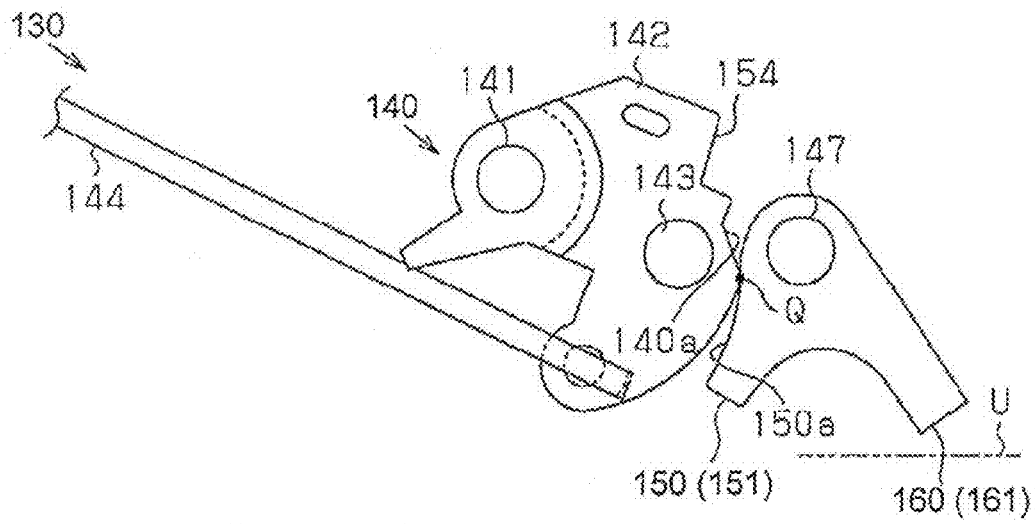
FIG. 20 is a drawing illustrating an operation of an unlocked state retaining mechanism of the seat slide apparatus for a vehicle according to the second embodiment.
Figure 21:
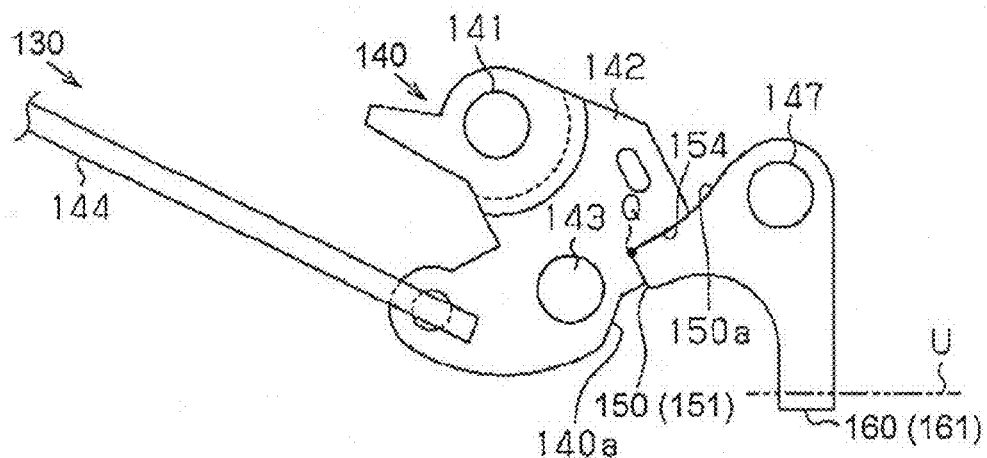
FIG. 21 is another drawing illustrating an operation of the unlocked state retaining mechanism of the seat slide apparatus for a vehicle according to the second embodiment in a state in which the unlocked state retaining mechanism is retaining the lock mechanism in an unlocked state.

More specifically, as FIGS. 20 and 21 illustrate, at the time at which the seat back is knocked down in the frontward direction, in accordance with a pull force transmitted via the connecting member 144, the second unlock lever 140 of the seat slide apparatus for a vehicle according to the second embodiment makes rotational movement that is in a clockwise direction in FIGS. 20 and 21, which is a direction in which the push protrusion 143 of the second unlock lever 140 is displaced in the downward direction, as FIG. 19 illustrates. Note that, the downward direction is the downward direction in FIG. 19. Accordingly, as FIG. 19 illustrates, the unlocked state retaining mechanism 130 of the second embodiment unlocks the lock mechanism 110 by the push protrusion 143 of the second unlock lever 140 pushing the flange 132 of the unlock lever 120 and the lever portion 112c of the lock lever 112 in the downward direction.

Note that, as FIG. 18 illustrates, a spring member 146, which is a helical torsion spring, is arranged to fit to the rotation shaft 141 of the second unlock lever 140. By an elastic force of the spring member 146, the second unlock lever 140 is rotationally biased in a direction that displaces the push protrusion 143 in the upward direction, which is an upward direction in FIG. 19, as FIG. 19 illustrates. Note that, the direction that displaces the push protrusion 143 in the upward direction is a counterclockwise direction in FIG. 18. Accordingly, in the seat slide apparatus for a vehicle according to the second embodiment, the push protrusion 143 is arranged to remain at a position at which the push protrusion 143 does not interfere with the flange 132 of the unlock lever 120 at a time before which the second unlock lever 140 makes rotational movement in accordance with the operation to knock down the seat back in the frontward direction.

Furthermore, as FIGS. 18, 20, and 21 illustrate, the unlocked state retaining mechanism 130 of the seat slide apparatus for a vehicle according to the second embodiment includes an unlocked state retaining lever 150. The unlocked state retaining lever 150 is arranged such that the unlocked state retaining lever 150 may make rotational movement in a state in which the unlocked state retaining lever 150 is in contact with an outer peripheral portion 140a of the second unlock lever 140. After the second unlock lever 140 makes rotational movement to unlock the lock mechanism 110, the unlocked state retaining lever 150 and the second unlock lever 140 cooperate with each other to retain the lock mechanism 110 in the state in which the lock mechanism 110 is unlocked.

More specifically, the unlocked state retaining lever 150 is arranged at a position parallel to the outer surface 105b of the side frame 105, similarly to the second unlock lever 140. The unlocked state retaining lever 150 is provided with a rotation shaft 147, which is positioned perpendicular to the outer surface 105b. The unlocked state retaining lever 150 is arranged such that the unlocked state retaining lever 150 is rotationally supported to the rotation shaft 147. Furthermore; the unlocked state retaining lever 150 includes a distal end portion 151. With the rotation shaft 147 as the proximal end, the unlocked state retaining lever 150 extends outwardly in a radial direction toward the distal end portion 151. Further-more, a spring member 152 is arranged to fit to the rotation shaft 147 of the unlocked state retaining lever 150. By an elastic force of the spring member 152, the unlocked state retaining lever 150 is rotationally biased in a direction that makes the distal end portion 151 move from the downward direction toward the upward direction, which is a clockwise direction in FIG. 18. Accordingly, in the seat slide apparatus for a vehicle according to the second embodiment, an outer peripheral portion 150a of the unlocked state retaining lever 150 is arranged to make contact with the outer peripheral portion 140a of the second unlock lever 140.

More specifically, as FIG. 20 illustrates, in the seat slide apparatus for a vehicle according to the second embodiment, at a time before which the second unlock lever 140 makes rotational movement in accordance with the operation to knock down the seat back in the frontward direction, the outer peripheral portion 150a of the unlocked state retaining lever 150 makes contact with the outer peripheral portion 140a of the second unlock lever 140 at a portion in the upward direction relative to the distal end portion 151, which is at the portion in the clockwise direction in FIG. 20 relative to the distal end portion 151. Furthermore, as FIGS. 20 and 21 illustrate, in the second embodiment, an outer peripheral form of the second unlock lever 140 is formed such that a contact point between the second unlock lever 140 and the unlocked state retaining lever 150, which is the contact point Q, moves in a direction that moves the contact point Q away from the rotation shaft 147 by the rotational movement in accordance with the operation to knock down the seat back in the frontward direction. Accordingly, in the second embodiment, the unlocked state retaining lever 150, which is rotationally biased by the spring member 152, makes rotational movement in conjunction with the rotational movement of the second unlock lever 140.

Furthermore, as FIG. 21 illustrates, a cut-out portion 154 configured to engage with the distal end portion 151 of the unlocked state retaining lever 150 is formed on the outer peripheral portion 140a of the second unlock lever 140. More specifically, by the second unlock lever 140 and the unlocked state retaining lever 150 making rotational movements in conjunction with each other in accordance with the operation to knock down the seat back in the frontward direction, the contact point Q between the second unlock lever 140 and the unlocked state retaining lever 150 seemingly moves on the outer peripheral portion 150a of the unlocked state retaining lever 150 toward the distal end portion 151. In the seat slide apparatus for a vehicle according to the second embodiment, the cut-out portion 154 of the second unlock lever 140 is configured such that the cut-out portion 154 engages with the distal end portion 151 of the unlocked state retaining lever 150 in a state in which the second unlock lever 140 is at a rotational position that unlocks the lock mechanism 110. Accordingly, in the second embodiment, the unlocked state retaining mechanism 130 at the aforementioned rotational position restrains the rotational movement of the second unlock lever 140 and the unlocked state retaining lever 150 so that the lock mechanism 110 is retained in the unlocked state, which is the state in which the lock mechanism 110 is retained in the state in which the lock mechanism 110 is unlocked.

Note that, as FIG. 18 illustrates, in the seat slide apparatus for a vehicle according to the second embodiment, a spring member 155, which is a coil spring, is arranged between the upper rail 103 and the lower rail 102. Accordingly, the upper rail 103 is biased by an elastic force of the spring member 155 in the vehicle frontward direction, which is rightward in FIG. 18. As a result, in the second embodiment, the seat slide device 101 is arranged such that the seat moves in the frontward direction in accordance with the operation to knock down the seat back in the frontward direction.

Furthermore, as FIGS. 20 and 21 illustrate, in the seat slide apparatus for a vehicle according to the second embodiment, the unlocked state retaining mechanism 130 includes the unlocked state release lever 160 sharing the rotation shaft 147 with the unlocked state retaining lever 150 and makes rotational movement integrally with the unlocked state retaining lever 150 at the rotation shaft 147.

More specifically, in the seat slide apparatus for a vehicle according to the second embodiment, the unlocked state release lever 160 includes an end portion 161 protruding outwardly in the radial direction. Note that the end portion 161 serves as the first end. The end portion 161 is arranged at a position spaced apart from the distal end portion 151 of the unlocked state retaining lever 150 by a predetermined angle between the end portion 161 and the distal end portion 151. The unlocked state release lever 160 is retained at the rotation shaft 147 in a state in which the end portion 161 of the unlocked state release lever 160 is arranged at a position in the vehicle frontward direction relative to the distal end portion 151 of the unlocked state retaining lever 150. Note that the unlocked state release lever 160, the rotation shaft 147, and the end portion 161 serve as a first unlocked state release mechanism.

Figure 22:
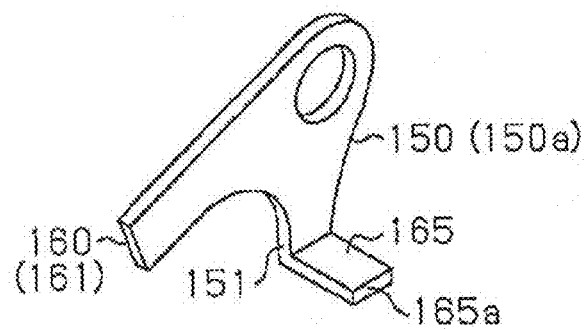
FIG. 22 is a perspective view drawing illustrating an unlocked state retaining lever of the seat slide apparatus for a vehicle according to the second embodiment.

Furthermore, as FIG. 22 illustrates, in the seat slide apparatus for a vehicle according to the second embodiment, the unlocked state retaining lever 150 and the unlocked state release lever 160 are integrally formed by processing a plate material. Accordingly, as FIGS. 20 and 21 illustrates, in a state in which the distal end portion 151 of the unlocked state retaining lever 150 makes rotational movement that displaces the distal end portion 151 in the upward direction, the end portion 161 of the unlocked state release lever 160 is displaced in the downward direction. In a state in which the distal end portion 151 of the unlocked state retaining lever 150 makes rotational movement that displaces the distal end portion 151 in the downward direction, the end portion 161 of the unlocked state release lever 160 is displaced in the upward direction.

Note that, as FIG. 18 illustrates, in the seat slide apparatus for a vehicle according to the second embodiment, a sensor bracket 163 extending in the elongating direction of the lower rail 102 is fixed on the lower rail 102 in a state in which the sensor bracket 163 covers the outer wall 102d and the top wall 102e of the lower rail 102, as FIG. 19 illustrates. Note that, the sensor bracket 163 serves as the operation body. Furthermore, the unlocked state release lever 160 is arranged at a position at which the end portion 161 may come into contact with a frontward end portion 163a of the sensor bracket 163 by the upper rail 103 moving in the vehicle rearward direction relative to the lower rail 102 in a state where the lock mechanism 110 is retained in the unlocked state in accordance with the operation to knock down the seat back in the frontward direction, which is the state illustrated in FIG. 21. Accordingly, in the second embodiment, the unlocked state retaining mechanism 130 is configured such that the lock mechanism 110 is released from the state in which the lock mechanism 110 is retained in the unlocked state by the unlocked state retaining lever 150 making rotational movement integrally with the unlocked state release lever 160.

More specifically, as FIG. 20 illustrates, in the seat slide apparatus for a vehicle according to the second embodiment, the end portion 161 of the unlocked state release lever 160 is arranged at a position in the upward direction relative to the sensor bracket 163 at a time before the unlocked state release lever 160 makes rotational movement in conjunction with the second unlock lever 140 by the operation to knock down the seat back in the frontward direction. Two-dot chain line U in each of FIG. 20 and FIG. 21 indicates a position of the sensor bracket 163. As FIG. 21 illustrates, the end portion 161 is arranged at a position in the downward direction relative to the position of the sensor bracket 163 in a state in which the unlocked state release lever 160 makes the rotational movement in conjunction with the second unlock lever 140 by the operation to knock down the seat back in the frontward direction.

Note that, at a time at which the operation to knock down the seat back in the frontward direction is operated at a seat slide position at which the end portion 161 of the unlocked state release lever 160 is at a position in the rearward direction relative to the frontward end portion 163a of the sensor bracket 163, the end portion 161 of the unlocked state release lever 160 makes contact with a top surface 163b of the sensor bracket 163. In the seat slide apparatus for a vehicle according to the second embodiment, the seat is configured to move in the vehicle frontward direction in a state in which the end portion 161 of the unlocked state release lever 160 slides on the top surface 163b of the sensor bracket 163 in a state in which the end portion 161 is in contact with the top surface 163b.

More specifically, in the seat slide apparatus for a vehicle according to the second embodiment, the unlocked state retaining mechanism 130 is configured such that the unlocked state release lever 160 of the unlocked state retaining mechanism 130 remains at a position that does not interfere with the sensor bracket 163 at a time of normal seat sliding operation using the operation lever 121, which is in a state in which the second unlock lever 140 has not made rotational movement in accordance with the operation to knock down the seat back in the frontward direction, which is the state illustrated in FIG. 20.

On the other hand, at a time at which the walk-in function is operated by the operation to knock down the seat back in the frontward direction, the end portion 161 of the unlocked state release lever 160 makes contact with the frontward end portion 163a of the sensor bracket 163, which serves as the operation body, by moving the seat that has moved in the vehicle frontward direction to a position in the vehicle rearward direction by moving the upper rail 103 in the rearward direction relative to the lower rail 102. As a result, the unlocked state release lever 160, which serves as the first unlocked state release mechanism, and the unlocked state retaining lever 150 integrally make rotational movement and the distal end portion 151 of the unlocked state retaining lever 150 disengages from the cut-out portion 154 of the second unlock lever 140. Accordingly, the lock mechanism 110 is released from the state in which the lock mechanism 110 is retained in the unlocked state, so that the seat is retained at a predetermined position in a sliding range.

Figure 23:
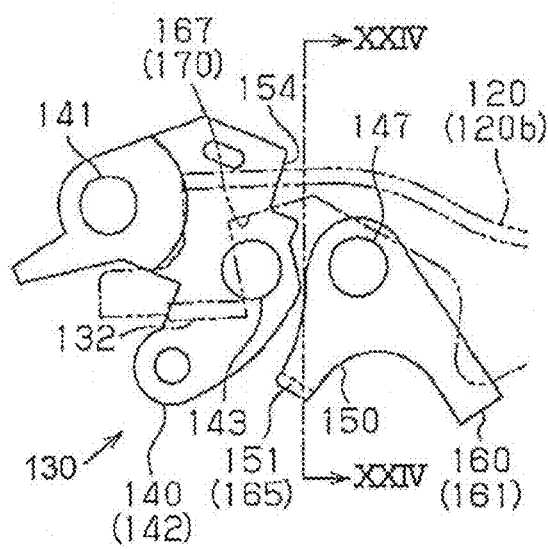
FIG. 23 is a drawing illustrating a positional relationship between a flange of the unlocked state retaining lever of the seat slide apparatus for a vehicle according to the second embodiment and a push portion of an unlock lever of the second embodiment in a state in which the lock mechanism is locked.
Figure 24:
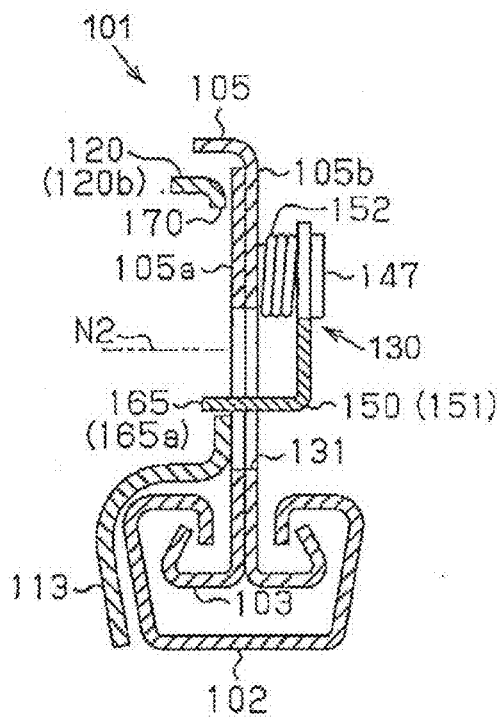
FIG. 24 is a cross sectional drawing taken along XXIV-XXIV in FIGS. 18 and 23, which is a position close to the flange of the unlocked state retaining lever of the seat slide apparatus for a vehicle according to the second embodiment.

Furthermore, as FIG. 18 illustrates, in the seat slide apparatus for a vehicle according to the second embodiment, the insertion through-hole 131 that extends through the side frame 105 in a thickness direction, which is the leftward-rightward direction in FIG. 19, extends to a position that corresponds to the distal end portion 151 of the unlocked state retaining lever 150. As FIGS. 22, 23, and 24 illustrate, the distal end portion 151 of the unlocked state retaining lever 150 is arranged with a flange 165 protruding in the direction toward the inner surface 105a of the side frame 105 from the direction of the outer surface 105b of the side frame 105 through the insertion through-hole 131. Note that, the outer surface 105b refers to a rightward surface in FIG. 24 and the inner surface 105a refers to a leftward surface in FIG. 24.

Figure 25:
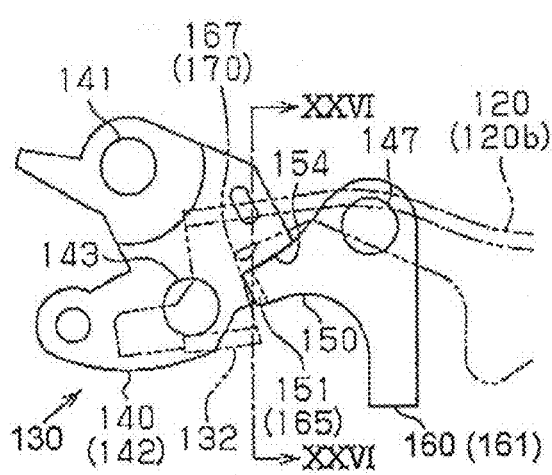
FIG. 25 is a drawing illustrating a positional relationship between the flange of the unlocked state retaining lever of the seat slide apparatus for a vehicle according to the second embodiment and the push portion of the unlock lever of the second embodiment in a state in which the lock mechanism is retained in the unlocked state.
Figure 26:
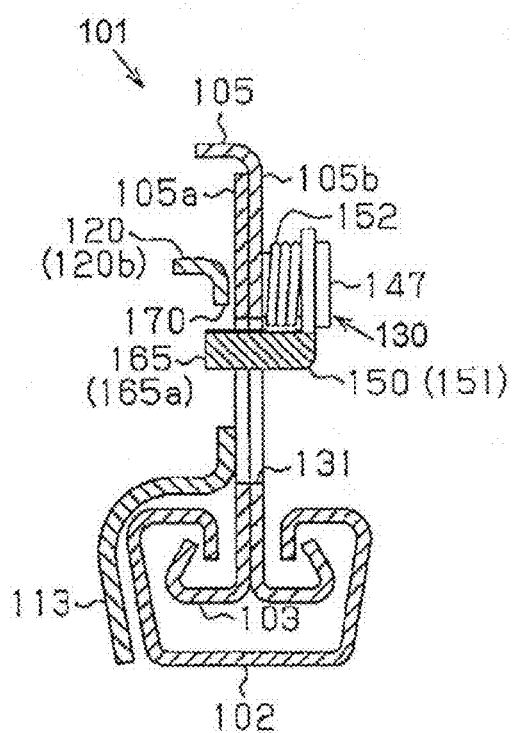
FIG. 26 is a cross sectional drawing taken along XXVI-XXVI in FIG. 25, which is a position close to the flange of the unlocked state retaining lever of the seat slide apparatus for a vehicle according to the second embodiment.
Figure 27:
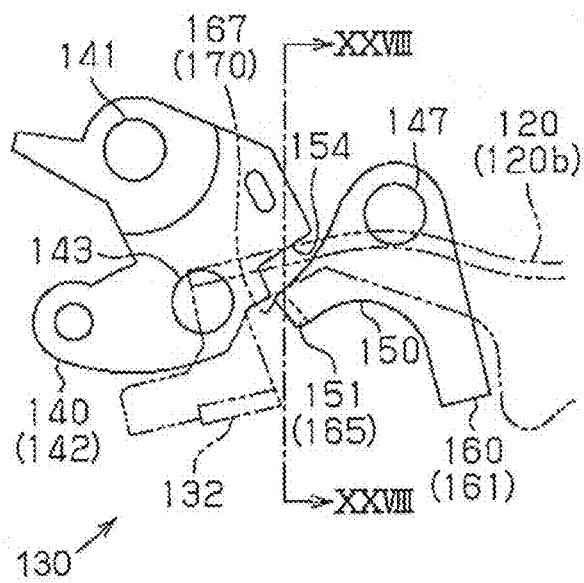
FIG. 27 is a drawing illustrating a positional relationship between the flange of the unlocked state retaining lever of the seat slide apparatus for a vehicle according to the second embodiment and the push portion of the unlock lever of the second embodiment in a state in which the lock mechanism is provided with a full stroke at the unlock lever.
Figure 28:
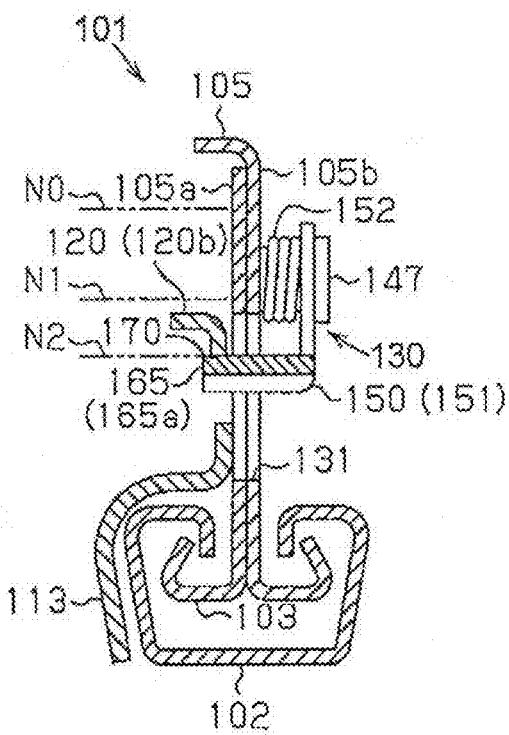
FIG. 28 is a cross sectional drawing taken along XXVIII-XXVIII in FIG. 27, which is a position close to the flange of the unlocked state retaining lever of the seat slide apparatus for a vehicle according to the second embodiment.

More specifically, as FIG. 24 illustrates, an end portion 165a of the flange 165 extends to a position that interacts with the unlock lever 120, which is arranged at a position in a direction of the inner surface 105a of the side frame 105. To be more specific, as FIGS. 25 and 26 illustrate, at a time at which the operation lever 121 is operated to provide the operational input in a state where the lock mechanism 110 is retained in the unlocked state in response to the operation to knock down the seat back in the frontward direction, the unlock lever 120 is arranged to rotationally move to push the flange 165 in the downward direction, as FIGS. 27 and 28 illustrate. Accordingly, in the seat slide apparatus for a vehicle according to the second embodiment, the unlocked state retaining lever 150 makes rotational movement that makes the distal end portion 151 of the unlocked state retaining lever 150 detach from the cut-out portion 154 of the second unlock lever 140.

In the seat slide apparatus for a vehicle according to the second embodiment, the flange 165 and the unlock lever 120 serve as a second unlocked state release mechanism. By rotational movement in accordance with the operational input at the operation lever 121, the unlock lever 120 pushes the unlocked state retaining lever 150 and moves the unlocked state retaining lever 150 to a rotational position at which the lock mechanism 110 is released from the state in which the lock mechanism 110 is retained in the unlocked state, so that the lock mechanism 110 is released from the state in which the lock mechanism 110 is retained in the unlocked state.

More specifically, as FIG. 23 illustrates, in the seat slide apparatus according to the second embodiment, the unlock lever 120 is formed with a cut-out portion 167 with an opening facing downward, which is the downward direction in FIG. 23. The cut-out portion 167 is formed at a position in a direction toward a proximal end of the unlock lever 120 relative to the flange 132. The flange 132, which is illustrated in FIG. 19, is the portion of the unlock lever 120 that is pushed in the downward direction by the push protrusion 143 of the second unlock lever 140. The direction toward the proximal end of the unlock lever 120 refers to rightward in FIG. 23. In the second embodiment, an inner wall surface of the cut-out portion 167 in the upward direction is a push portion 170 at which pushes down the flange 165 of the unlocked state retaining lever 150.

More specifically, in the seat slide apparatus according to the second embodiment, the pushing end 120b of the unlock lever 120 is formed in the aforementioned form. Accordingly, the push portion 170 that pushes the flange 165 of the unlocked state retaining lever 150 downwardly is arranged at a position that is in the upward direction relative to the flange 132 that is pushed downwardly by the second unlock lever 140. Accordingly, as FIGS. 23 and 24 illustrate, the push portion 170 is configured such that the push portion 170 remains at a position that does not interfere with the flange 165 at a time before the second unlock lever 140 makes rotational movement in accordance with the operation to knock down the seat back in the frontward direction, which in other words is in a state where the second unlock lever 140 is not at a position to push the unlock lever 120.

In other words, in the seat slide apparatus for a vehicle according to the second embodiment, as FIGS. 25 and 26 illustrate, the push portion 170 of the unlock lever 120 pushes the flange 165 of the unlocked state retaining lever 150 downwardly on condition that the lock mechanism 110 is retained in the unlocked state and the unlock lever 120 is furthermore rotated to a full stroke state by the operational input at the operation lever 121. Accordingly, as FIGS. 27 and 28 illustrate, the unlocked state retaining lever 150 makes rotational movement to a position that disengages the distal end portion 151 of the unlocked state retaining lever 150 from the cut-out portion 154 of the second unlock lever 140 so that the lock mechanism 110 may be released from the state in which the lock mechanism 110 is retained in the unlocked state.

Note that, a two-dot chain line N0 in FIG. 28 indicates a position of the push portion 170 at a time at which the lock mechanism 110 is in the locked state, which is the state in which the lock mechanism 110 is locked, and the operation lever 121 is not operated. A two-dot chain line N1 in FIG. 28 indicates the position of the push portion 170 at a time at which the lock mechanism 110 is in a state in which the lock mechanism 110 is retained in the unlocked state and the operation lever 121 is not operated. Furthermore, a two-dot chain line N2 in FIGS. 24 and 28 indicates the position of the push portion 170 at a time at which the unlock lever 120 is operated to the full stroke state by the operational input at the operation lever 121.

Accordingly, in the seat slide apparatus for a vehicle according to the second embodiment, by an operator operating the operation lever 121, the lock mechanism 110 may be released from the state in which the lock mechanism 110 is retained in the unlocked state at a selected position during sliding movement even at a time before the seat is moved in the vehicle rearward direction to a position at which the unlocked state release lever 160 makes contact with the sensor bracket 163 after the seat is moved in the vehicle frontward direction by operating the walk-in function. As a result, similarly to the seat slide apparatus for a vehicle according to the first embodiment, a seat position may be adjusted with easier operation and with more convenience.

In addition, in a state where the second unlock lever 140 is not at a position to push the unlock lever 120, the push portion 170 is arranged not to interfere with the flange 165 even with the operational input at the operation lever 121. Accordingly, at a time at which the lock mechanism 110 is unlocked by the operation at the operation lever 121 in the normal seat sliding operation, the second unlock lever 140 and the unlocked state retaining lever 150 do not make rotational movement. As a result, a false operation may be prevented to secure high reliability of the seat sliding operation. Furthermore, a noise that is generated by the unlock lever 120 making contact with the unlocked state retaining lever 150 may be prevented so that the seat slide apparatus may be operated with an operational noise kept at a low level.

The seat slide apparatus for a vehicle according to the first embodiment and the second embodiment may be altered in following manners. In the first embodiment, the seat slide apparatus for a vehicle is applied to the vehicle seat 1, which is the seat that may be divided into the seat 11 and the seat 12, which are a pair of seats separated into a rightward seat and a leftward seat. The vehicle seat 1 is provided as a rear seat. More specifically, the vehicle seat 1 is provided as a second row seat. Nevertheless, the seat slide apparatus for a vehicle may be similarly applied to a driver seat or to a front passenger seat. Furthermore, the seat slide apparatus for a vehicle may be similarly applied to a third row seat and seats behind the third row.

In the first embodiment, the lock mechanism 40 is arranged such that each upper rail 21 is provided with two lock levers, which are the lock lever 41A and the lock lever 41B. The lock lever 41A and the lock lever 41B are arranged in the direction that conforms to the longitudinal direction of the upper rail 21. Nevertheless, the number of lock lever 41 on each upper rail 21 may be altered appropriately. For example one lock lever 41 may be arranged on each upper rail 21 instead, Furthermore, characteristics of the lock lever 41, for example form and movement, may be altered appropriately.

In the first embodiment, the second unlock lever 61 makes rotational movement by the pull force generated by the pulling portion 64 pulling the wire 63 at the time at which the seat back is knocked down in the frontward direction. Furthermore, together with the second unlock lever 61, the unlock levers 50 including the unlock lever 50A make rotational movement, which in turn push the lock levers 41 including the lock lever 41A downwardly so that the lock mechanism 40 is unlocked. The configuration to unlock the lock mechanism 40 is not limited to the above-described configuration. A configuration of the second unlock mechanism that by pushing the unlock lever 50 and makes the lock mechanism 40 rotationally move in the direction to unlock may be altered appropriately.

More specifically, the second unlock mechanism may be configured to unlock the lock mechanism 40 by a selected seat operation instead of by the operation to knock down the seat back in the frontward direction. For example, an input device similar to an operation lever or a switch, which is operated by an operator, may be provided to unlock the lock mechanism 40 and to retain the lock mechanism 40 in the unlocked state. The lock mechanism 40 may be unlocked by an operational input at such operation lever or a switch. Note that, in such case, the seat back 3 may remain upright instead of being knocked down in the frontward direction similarly to a time at which a common walk-in function is operated. Similarly, the second unlock mechanism may be altered appropriately to unlock the lock mechanism 110 in the second embodiment. The lock mechanism 110 may be unlocked by a predetermined seat operation instead of by an operation to knock down the seat back in the frontward direction.

In the first embodiment, the unlocked state retaining lever 66 is arranged to make rotational movement at a position at which the end portion 66a of the unlocked state retaining lever 66 and the action bar 71a of the unlocked state release lever 71 intersect by rotational movement of the unlocked state release lever 71. Nevertheless, a configuration of the unlocked state retaining lever 66 is not limited to the aforementioned configuration and may be altered appropriately on condition that the unlocked state retaining lever 66 is configured to retain the lock mechanism 40 in the state in which the lock mechanism 40 is unlocked by cooperating with the second unlock mechanism by moving to a position that retains the lock mechanism 40 in the unlocked state by operating in conjunction with the second unlock mechanism and, furthermore, configured to move in the direction to release the lock mechanism 40 from the state in which the lock mechanism 40 is retained in the unlocked state by the unlocked state release lever 71 pushing the unlocked state retaining lever 66. For example, the unlocked state retaining lever 66 may move to the position where the lock mechanism 40 is retained in the unlocked state by making swinging movement instead of by making rotational movement. Furthermore, a form of the unlocked state retaining lever 66 may be altered appropriately.

In the first embodiment, as FIG. 8 illustrates, the rotation shaft 46, which becomes the center of rotational movement L for the second unlock lever 61, is arranged to extend in the direction that is substantially perpendicular to the two upper rails 21. Furthermore, the unlocked state retaining lever 66 includes the rotation shaft 67 arranged substantially parallel to the center of rotational movement L. In addition, the unlocked state release lever 71 includes the rotation shaft 72 extending in the upward-downward direction at a position skew to the rotation shaft 67 of the unlocked state retaining lever 66. Nevertheless, the directions in which the unlocked state retaining lever 66 and the rotation shaft 67 extend and the directions in which the unlocked state release lever 71 and the rotation shaft 72 extend are not limited to the aforementioned directions and may be appropriately altered, for example, by an alteration made to a positional arrangement of the unlocked state retaining mechanism 60.

In the first embodiment, the rotational direction in which the action bar 71a moves toward the vehicle frontward direction is referred to as the first direction and the rotational direction in the opposite direction relative to the first direction is referred to as the second direction. Nevertheless, the definition of the first direction in this case is not limited to the aforementioned direction.

In the first embodiment, the unlocked state release lever 71 is configured such that the rotation operation portion 74 of the unlocked state release lever 71 protrudes from the housing cover 75 in a side direction of the seat 11, which is the side direction of the side shield 31, by the unlocked state release lever 71 making rotational movement in the first direction. Furthermore, on the side shield 77 of the seat 12, which is the seat that is arranged adjacent to the seat 11 in the side direction, the operation protrusion 78, which serves as the operation body, is provided. Nevertheless, arrangement of the operation body is not limited at the aforementioned position. The operation body may be arranged at a non-moving portion of the vehicle at which the position relative to the upper rail 21 changes by movement of the upper rail 21 relative to the lower rail 5, which is a portion similar to the floor portion F of the vehicle, the lower rail 5, and an inner wall of a vehicle interior.

Figure 29:
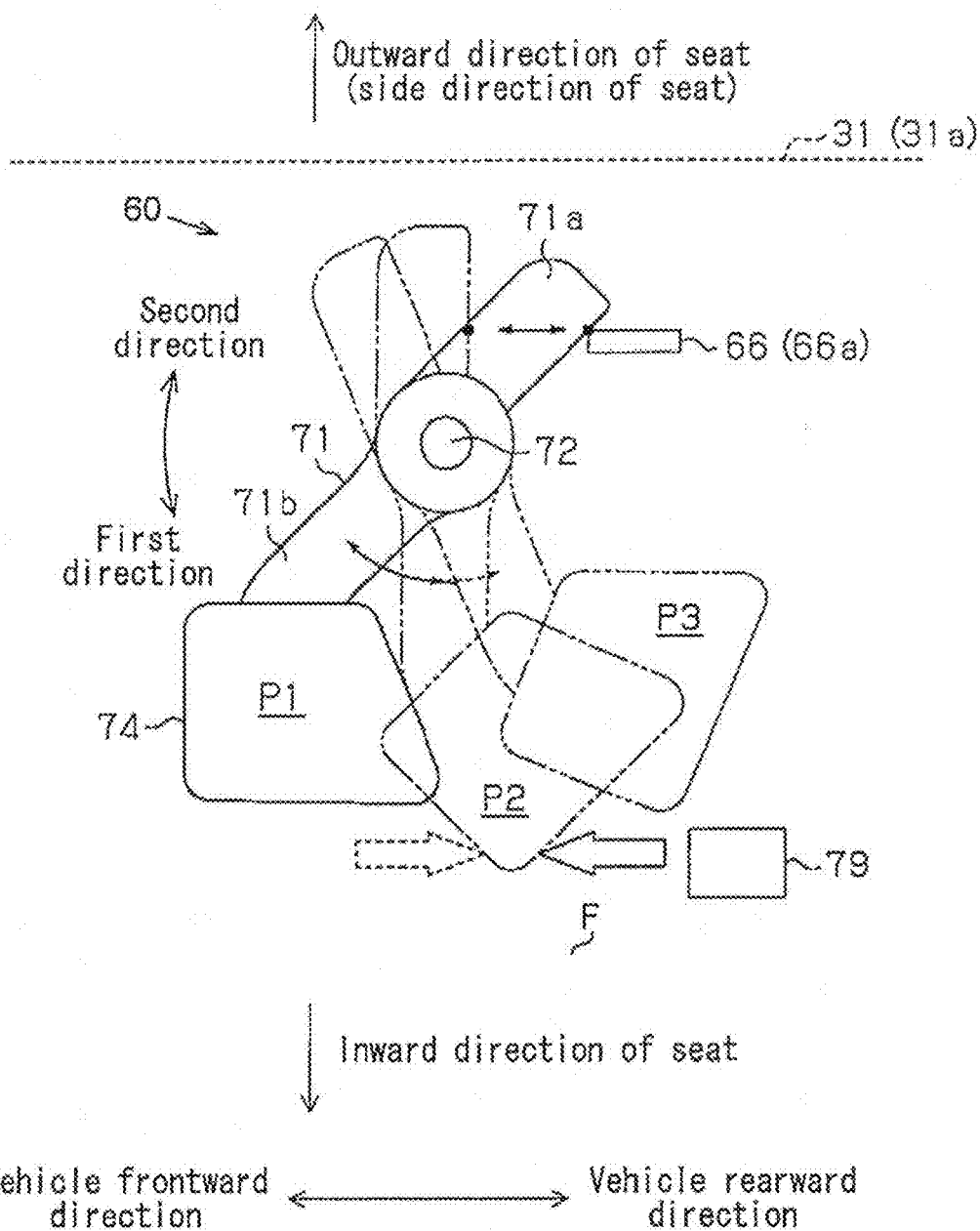
FIG. 29 is a drawing illustrating a general configuration of an unlocked state retaining mechanism of the seat slide apparatus according to an alternative embodiment.

More specifically, as FIG. 29 illustrates, the unlocked state release lever 71 may be arranged such that the operation bar 71b and the rotation operation portion 74 of the unlocked state release lever 71 extends in an inward direction of a seat, which is a downward direction in FIG. 29. In FIG. 1, the inward direction refers to a direction toward inside portion of the side shield 31. Furthermore, an operation protrusion 79, which serves as the operation body, is arranged on the floor portion F of the vehicle, which is an example of the non-moving portion of the vehicle. The operation protrusion 79 is configured to make contact with the rotation operation portion 74 by a seat sliding operation.

As examples of arrangements to make the operation protrusion 79 contact with the rotation operation portion 74, the operation protrusion 79 may be arranged on a trajectory of the rotation operation portion 74, the trajectory that corresponds to movement of the upper rail 21 relative to the lower rail 5. Furthermore, the operation bar 71b may be bent so that the rotation operation portion 74 is arranged close to the floor portion F. The configuration may be altered on condition that the unlocked state release lever 71 makes rotational movement in the first direction in conjunction with the unlocked state retaining lever 66 that moves to the position where the lock mechanism 40 is retained in the unlocked state and on condition that the operation body makes contact with the rotation operation portion 74 in the direction that conforms to the direction in which the upper rail 21 moves relative to the lower rail 5.

In the first embodiment, each of the seat 11 and the seat 12 is provided with two lower rails 5 as a set and with two upper rails 21, accordingly. Nevertheless, number of rails for each seat may be one or may be three or more.

In the first embodiment, the second unlocked state release lever 81 is configured to push the protruding portion to be pushed 82 arranged on the unlocked state retaining lever 66, however, the second unlocked state release lever 81 may be configured to push a portion other than the protruding portion to be pushed 82.

In the first embodiment, the helical torsion spring 73 is fitted to the rotation shaft 72 as the elastic member so that the unlocked state release lever 71 is biased in the second direction, however, a similar elastic member, for example, a plate spring may be used instead of a helical torsion spring. Similarly, in the second embodiment, each of the spring members 116, 123, 146, 152 or similar spring members may be altered to an elastic member other than a helical torsion spring.

In the second embodiment, the unlocked state retaining lever 150 and the unlocked state release lever 160 are integrally formed by processing a plate material. Nevertheless, on condition that the unlocked state retaining lever 150 and the unlocked state release lever 160 include and share the rotation shaft 147 and integrally make rotational movement thereat, the unlocked state retaining lever 150 and the unlocked state release lever 160 may be altered to be formed as separate bodies.

In the first embodiment, the operational input at the operation lever 48 that protrudes in the side direction of the side shield 32 is converted to rotational movements of the unlock levers 50 and the rotation shafts 46, 47 by the link mechanism 49. Note that the unlock levers 50, rotation shafts 46, 47 and the link mechanism 49 serve as the first unlock mechanism, Furthermore, in the second embodiment, the operation lever 121 having the operation portion 121*a* that extends in the width direction of the seat at the position in the frontward direction of the seat is configured to connect to the one end of the unlock lever 120 that makes rotational movement at the rotation shaft 119. Note that the unlock lever 120 and the rotation shaft 119 serves as the first unlock mechanism. Nevertheless, the configuration of the first unlock mechanism may be altered appropriately, on condition that the first unlock mechanism includes an unlock lever that rotationally moves by an operational input at an operation lever.

Technical ideas that may be obtained from the seat slide apparatus for a vehicle according to the embodiments described in this disclosure will be described next. The seat slide apparatus for a vehicle is characterized by the second unlock mechanism including the second unlock lever 61, 140. The second unlock lever 61, 140 pushes the unlock lever 50, 50A, 120 by making rotational movement in accordance with a predetermined seat operation. Furthermore, the seat slide apparatus for a vehicle is characterized by the unlocked state retaining lever 66, 150 retaining the lock mechanism 40, 110 at a position of the unlocked state by the unlocked state retaining lever 66, 150 making rotational movement in conjunction with movement of the second unlock lever 61, 140 and engaging with the second unlock lever 61, 140. Furthermore, the seat slide apparatus for a vehicle is characterized by the second unlocked state release mechanism configured to push the unlocked state retaining lever 66, 150 to a position where the unlocked state retaining lever 66, 150 disengages from the second unlock lever 61, 140.

The seat slide apparatus for a vehicle is characterized by the first unlocked state release mechanism including an unlocked state release lever 71, 160 making rotational movement integrally with the unlocked state retaining lever 66, 150 by the first end of the unlocked state release lever 71, 160 coming into contact with the operation body to rotationally move the unlocked state retaining lever 66, 150 to a position where the unlocked state retaining lever 66, 150 disengages from the second unlock lever 61, 140.

The seat slide apparatus for a vehicle is characterized by the second unlocked state release mechanism arranged with the unlock lever 120 to push the unlocked state retaining lever 150 to rotationally move the unlocked state retaining lever 150 to a position where the unlocked state retaining lever 150 disengages from the second unlock lever 140.

According to an aspect of this disclosure, the seat slide apparatus for a vehicle includes a lower rail 5, 102 configured to be retained on a floor portion F of the vehicle, an upper rail 21, 103 configured to retain a vehicle seat 1 including a seat 11 and a seat 12, the upper rail 21, 103 configured to move relative to the lower rail 5, 102, a lock mechanism 40, 110 configured to restrain movement of the upper rail 21, 103 relative to the lower rail 5, 102, a first unlock mechanism (a rotation shaft 46, 47, 119, a link mechanism 49, an unlock lever 50, 50A, 120) including an unlock lever 50, 50A, 120 making rotational movement in response to an operational input at an operation lever 48, 121, the first unlock mechanism (the rotation shaft 46, 47, 119, the link mechanism 49, the unlock lever 50, 50A, 120) operating the lock mechanism 40, 110 to unlock by the rotational movement of the unlock lever 50, 50A, 120, a second unlock mechanism (a second unlock lever 61, 140, a wire 63, a connecting member 144, a pulling portion 64, a pulling lever 145) making the unlock lever 50, 50A, 120 rotationally move in a direction that unlocks the lock mechanism 40, 110 by pushing the unlock lever 50, 50A, 120 in accordance with a predetermined seat operation, an unlocked state retaining lever 66, 150 configured to retain the lock mechanism 40, 110 in an unlocked state cooperating with the second unlock mechanism (the second unlock lever 61, 140, the wire 63, the connecting member 144, the pulling portion 64, the pulling lever 145) by operating in conjunction with the second unlock mechanism (the second unlock lever 61, 140, the wire 63, the connecting member 144, the pulling portion 64, and the pulling lever 145) to move to a position where the lock mechanism 40, 110 is retained in the unlocked state, a first unlocked state release mechanism (an unlocked state release lever 71, 160, a rotation shaft 72, 147, a helical torsion spring 73, a rotation operation portion 74, an end portion 161) moving the unlocked state retaining lever 66, 150 to a position where the lock mechanism 40, 110 is released from being retained in the unlocked state by making contact with an operation body (an operation protrusion 78, 79, a sensor bracket 163) in accordance with movement of the upper rail 21, 103 relative to the lower rail 5, 102, and a second unlocked state release mechanism (a second unlocked state release lever 81, a protruding portion to be pushed 82, the unlock lever 120, a flange 165) moving the unlocked state retaining lever 66, 150 to a position where the lock mechanism 40, 110 is released from being retained in the unlocked state by pushing the unlocked state retaining lever 66, 150 in accordance with the operational input.

Accordingly, the seat slide apparatus for a vehicle may be released from the state in which the lock mechanism 40, 110 is retained in the unlocked state at a selected position during sliding movement. The lock mechanism 40, 110 may be released from the state in which the lock mechanism 40, 110 is retained in the unlocked state at a selected position during sliding movement even at a time before which the first unlocked state release mechanism (the unlocked state release lever 71, 160, the rotation shaft 72, 147, the helical torsion spring 73, the rotation operation portion 74, the end portion 161) makes contact with the operation body (the operation protrusion 78, 79, the sensor bracket 163) in accordance with movement of the upper rail 21, 103 relative to the lower rail 5, 102 and moves the unlocked state retaining lever 66, 150 to a position that releases the lock mechanism 40, 110 from the state in which the lock mechanism 40, 110 is retained in the unlocked state. As a result, a seat position may be adjusted with easier operation and with more convenience.

According to another aspect of this disclosure, the first unlocked state release mechanism (the unlocked state release lever 71, the rotation shaft 72, the helical torsion spring 73, the rotation operation portion 74) of the seat slide apparatus for a vehicle includes an unlocked state release lever 71 making rotational movement by a first end (the rotation operation portion 74) of the unlocked state release lever 71 coming into contact with the operation body (the operation protrusion 78, 79) and a second end (an action bar 71a) of the unlocked state release lever 71 pushing the unlocked state retaining lever 66 in a direction that releases the lock mechanism 40 from being retained in the unlocked state. Furthermore, the second unlocked state release mechanism (the second unlocked state release lever 81, the protruding portion to be pushed 82) of the seat slide apparatus for a vehicle includes a second unlocked state release lever 81 making rotational movement integrally with the unlock lever 50, 50A in accordance with the operational input and pushing the unlocked state retaining lever 66 in the direction that releases the lock mechanism 40 from being retained in the unlocked state.

Accordingly, the unlocked state retaining lever 66 may be reliably pushed in the direction that releases the lock mechanism 40 from the state in which the lock mechanism 40 is retained, in the unlocked state in accordance with the operational input at the operation lever 48.

According to further aspect of this disclosure, the second unlocked state release mechanism 120, 165 of the seat slide apparatus for a vehicle is configured with the unlock lever 120 to push the unlocked state retaining lever 150 in a direction that releases the lock mechanism 110 from being retained in the unlocked state in accordance with the operational input.

Accordingly, the unlocked state retaining lever 150 may be reliably pushed in the direction that releases the lock mechanism 110 from the state in which the lock mechanism 110 is retained in the unlocked state in accordance with the operational input at the operation lever 121.

According to another aspect of this disclosure, the second unlocked state release mechanism (the second unlocked state release lever 81, the protruding portion to be pushed 82, the unlock lever 120, the flange 165) of the seat slide apparatus for a vehicle remains at a position where the second unlocked state release mechanism (the second unlocked state release lever 81, the protruding portion to be pushed 82, the unlock lever 120, the flange 165) does not interfere with the unlocked state retaining lever 66, 150 at the time of the operational input at the operation lever 48, 121 in a state where the second unlock mechanism (a second unlock lever 61, 140, a wire 63, a connecting member 144, a pulling portion 64, a pulling lever 145) is not pushing the unlock lever 50, 50A, 120.

Accordingly, at a time at which the lock mechanism 40, 110 is unlocked by an operation at the operation lever 48, 121 in a normal seat sliding operation, the unlocked state retaining lever 66, 150 does not make rotational movement. As a result, a false operation may be prevented to secure high reliability of the seat sliding operation. Furthermore, a noise that is generated by the second unlocked state release mechanism (the second unlocked state release lever 81, the unlock lever 120) making contact with the unlocked state retaining lever 66, 150 may be prevented so that the seat slide apparatus for a vehicle may be operated with an operational noise kept at a low level.

According to further aspect of this disclosure, the predetermined seat operation of the seat slide apparatus for a vehicle is an operation to knock down a seat back 3 in a frontward direction.

Accordingly, the walk-in function may be used with an operation similar to that of many conventional seat slide apparatus.

According to another aspect of this disclosure, the second unlock mechanism (the second unlock lever 61, 140, the wire 63, the connecting member 144, the pulling portion 64, the pulling lever 145) of the seat slide apparatus for a vehicle includes a second unlock lever 61, 140 pushing the unlock lever 50, 50A, 120 by making rotational movement in response to the predetermined seat operation. Furthermore, the unlocked state retaining lever 66, 150 of the seat slide apparatus for a vehicle retains the lock mechanism 40, 110 at a position where the lock mechanism 40, 110 is in the unlocked state by making rotational movement in conjunction with movement of the second unlock lever 61, 140 and engaging with the second unlock lever 61, 140. Furthermore, the second unlocked state release mechanism (the second unlocked state release lever 81, the protruding portion to be pushed 82, the unlock lever 120, the flange 165) of the seat slide apparatus for a vehicle pushes the unlocked state retaining lever 66, 150 to move rotationally to a position where the unlocked state retaining lever 66, 150 disengages from the second unlock lever 61, 140.

Accordingly, the seat slide apparatus for a vehicle may be released from the state in which the lock mechanism 40, 110 is retained in the unlocked state at a selected position during sliding movement. The lock mechanism 40, 110 may be released from the state in which the lock mechanism 40, 110 is retained in the unlocked state at a selected position during sliding movement even at a time before which the first unlocked state release mechanism (the unlocked state release lever 71, 160, the rotation shaft 72, 147, the helical torsion spring 73, the rotation operation portion 74, the end portion 161) makes contact with the operation body (the operation protrusion 78, 79, the sensor bracket 163) in accordance with movement of the upper rail 21, 103 relative to the lower rail 5, 102 and moves the unlocked state retaining lever 66, 150 to a position that releases the lock mechanism 40, 110 from the state in which the lock mechanism 40, 110 is retained in the unlocked state. As a result, a seat position may be adjusted with easier operation and with more convenience.

According to further aspect of this disclosure, the first unlocked state release mechanism (the unlocked state release lever 71, 160, the rotation shaft 72, 147, the helical torsion spring 73, the rotation operation portion 74, the end portion 161) of the seat slide apparatus for a vehicle includes the unlocked state release lever 71, 160 making rotational movement integrally with the unlocked state retaining lever 66, 150 by the first end (the rotation operation portion 74, an end portion 161) of the unlocked state release lever 71, 160 coming into contact with the operation body 78, 79, 163 to rotationally move the unlocked state retaining lever 66, 150 to a position where the unlocked state retaining lever 66, 150 disengages from the second unlock lever 61, 140.

Accordingly, the unlocked state retaining lever 66, 150 may be reliably pushed in the direction that releases the lock mechanism 40, 110 from the state in which the lock mechanism 40, 110 is retained in the unlocked state in accordance with the operational input at the operation lever 48, 121.

According to another aspect of this disclosure, the second unlocked state release mechanism 120, 165 of the seat slide apparatus for a vehicle is configured with the unlock lever 120 to push the unlocked state retaining lever 150 to rotationally move the unlocked state retaining lever 150 to a position where the unlocked state retaining lever 150 disengages from a second unlock lever 140.

Accordingly, the unlocked state retaining lever 150 may be reliably pushed in the direction that releases the lock mechanism 110 from the state in which the lock mechanism 110 is retained in the unlocked state in accordance with the operational input at the operation lever 121.

The principles, preferred embodiment and mode of operation of the present invention have been described in the foregoing specification. However, the invention which is intended to be protected is not to be construed as limited to the particular embodiments disclosed. Further, the embodiments described herein are to be regarded as illustrative rather than restrictive, Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

The invention claimed is:

1. A seat slide apparatus for a vehicle, comprising:
   a lower rail configured to be retained on a floor portion of the vehicle;
   an upper rail configured to retain a seat, the upper rail configured to move relative to the lower rail;
   a lock mechanism configured to restrain movement of the upper rail relative to the lower rail;
   a first unlock mechanism including an unlock lever making rotational movement in response to an operational input at an operation lever, the first unlock mechanism operating the lock mechanism to unlock by the rotational movement of the unlock lever;
   a second unlock mechanism making the unlock lever rotationally move in a direction that unlocks the lock mechanism by pushing the unlock lever in accordance with a predetermined seat operation;
   an unlocked state retaining lever configured to retain the lock mechanism in an unlocked state cooperating with the second unlock mechanism by operating in conjunction with the second unlock mechanism to move to a position where the lock mechanism is retained in the unlocked state;
   a first unlocked state release mechanism moving the unlocked state retaining lever to a position where the lock mechanism is released from being retained in the unlocked state by making contact with an operation body in accordance with movement of the upper rail relative to the lower rail; and
   a second unlocked state release mechanism moving the unlocked state retaining lever to a position where the lock mechanism is released from being retained in the unlocked state by pushing the unlocked state retaining lever in accordance with the operational input, wherein
   the first unlocked state release mechanism includes an unlocked state release lever making rotational movement by a first end of the unlocked state release lever coming into contact with the operation body and a second end of the unlocked state release lever pushing the unlocked state retaining lever in a direction that releases the lock mechanism from being retained in the unlocked state, and wherein
   the second unlocked state release mechanism includes a second unlocked state release lever making rotational movement integrally with the unlock lever in accordance with the operational input and pushing the unlocked state retaining lever in the direction that releases the lock mechanism from being retained in the unlocked state.

2. A seat slide apparatus for a vehicle, comprising:
   a lower rail configured to be retained on a floor portion of the vehicle;
   an upper rail configured to retain a seat, the upper rail configured to move relative to the lower rail;
   a lock mechanism configured to restrain movement of the upper rail relative to the lower rail;
   a first unlock mechanism including an unlock lever making rotational movement in response to an operational input at an operation lever, the first unlock mechanism operating the lock mechanism to unlock by the rotational movement of the unlock lever;
   a second unlock mechanism making the unlock lever rotationally move in a direction that unlocks the lock mechanism by pushing the unlock lever in accordance with a predetermined seat operation;
   an unlocked state retaining lever configured to retain the lock mechanism in an unlocked state cooperating with the second unlock mechanism by operating in conjunction with the second unlock mechanism to move to a position where the lock mechanism is retained in the unlocked state;
   a first unlocked state release mechanism moving the unlocked state retaining lever to a position where the lock mechanism is released from being retained in the unlocked state by making contact with an operation body in accordance with movement of the upper rail relative to the lower rail; and
   a second unlocked state release mechanism moving the unlocked state retaining lever to a position where the lock mechanism is released from being retained in the unlocked state by pushing the unlocked state retaining lever in accordance with the operational input,
   wherein the second unlocked state release mechanism is configured with the unlock lever to push the unlocked state retaining lever in a direction that releases the lock mechanism from being retained in the unlocked state in accordance with the operational input.

3. The seat slide apparatus for a vehicle according to claim 1, wherein the second unlocked state release mechanism is configured with the unlock lever to push the unlocked state retaining lever in the direction that releases the lock mechanism from being retained in the unlocked state in accordance with the operational input.

4. The seat slide apparatus for a vehicle according to claim 1, wherein the second unlocked state release mechanism remains at a position where the second unlocked state release mechanism does not interfere with the unlocked state retaining lever at a time of the operational input at the operation lever in a state where the second unlock mechanism is not pushing the unlock lever.

5. The seat slide apparatus for a vehicle according to claim 2, wherein the second unlocked state release mechanism remains at a position where the second unlocked state release mechanism does not interfere with the unlocked state retaining lever at a time of the operational input at the operation lever in a state where the second unlock mechanism is not pushing the unlock lever.

6. A seat slide apparatus for a vehicle, comprising:
   a lower rail configured to be retained on a floor portion of the vehicle;
   an upper rail configured to retain a seat, the upper rail configured to move relative to the lower rail;
   a lock mechanism configured to restrain movement of the upper rail relative to the lower rail;
   a first unlock mechanism including an unlock lever making rotational movement in response to an operational input at an operation lever, the first unlock mechanism operating the lock mechanism to unlock by the rotational movement of the unlock lever;

a second unlock mechanism making the unlock lever rotationally move in a direction that unlocks the lock mechanism by pushing the unlock lever in accordance with a predetermined seat operation;

an unlocked state retaining lever configured to retain the lock mechanism in an unlocked state cooperating with the second unlock mechanism by operating in conjunction with the second unlock mechanism to move to a position where the lock mechanism is retained in the unlocked state;

a first unlocked state release mechanism moving the unlocked state retaining lever to a position where the lock mechanism is released from being retained in the unlocked state by making contact with an operation body in accordance with movement of the upper rail relative to the lower rail; and a second unlocked state release mechanism moving the unlocked state retaining lever to a position where the lock mechanism is released from being retained in the unlocked state by pushing the unlocked state retaining lever in accordance with the operational input, wherein the predetermined seat operation is an operation to knock down a seat back in a frontward direction.

7. The seat slide apparatus for a vehicle according to claim 1, wherein the predetermined seat operation is an operation to knock down a seat back in a frontward direction.

8. The seat slide apparatus for a vehicle according to claim 2, wherein the predetermined seat operation is an operation to knock down a seat back in a frontward direction.

9. The seat slide apparatus for a vehicle according to claim 1, wherein the second unlock mechanism includes a second unlock lever pushing the unlock lever by making rotational movement in response to the predetermined seat operation, wherein the unlocked state retaining lever retains the lock mechanism at a position where the lock mechanism is in the unlocked state by making rotational movement in conjunction with movement of the second unlock lever and engaging with the second unlock lever, and wherein the second unlocked state release mechanism pushes the unlocked state retaining lever to move rotationally to a position where the unlocked state retaining lever disengages from the second unlock lever.

10. The seat slide apparatus for a vehicle according to claim 2, wherein the second unlock mechanism includes a second unlock lever pushing the unlock lever by making rotational movement in response to the predetermined seat operation, wherein the unlocked state retaining lever retains the lock mechanism at a position where the lock mechanism is in the unlocked state by making rotational movement in conjunction with movement of the second unlock lever and engaging with the second unlock lever, and wherein the second unlocked state release mechanism pushes the unlocked state retaining lever to move rotationally to a position where the unlocked state retaining lever disengages from the second unlock lever.

11. The seat slide apparatus for a vehicle according to claim 1, wherein the first unlocked state release mechanism includes the unlocked state release lever making rotational movement integrally with the unlocked state retaining lever by the first end of the unlocked state release lever coming into contact with the operation body to rotationally move the unlocked state retaining lever to a position where the unlocked state retaining lever disengages from a second unlock lever.

12. The seat slide apparatus for a vehicle according to claim 2, wherein the first unlocked state release mechanism includes an unlocked state release lever making rotational movement integrally with the unlocked state retaining lever by a first end of the unlocked state release lever coming into contact with the operation body to rotationally move the unlocked state retaining lever to a position where the unlocked state retaining lever disengages from a second unlock lever.

13. The seat slide apparatus for a vehicle according to claim 1, wherein the second unlocked state release mechanism is configured with the unlock lever to push the unlocked state retaining lever to rotationally move the unlocked state retaining lever to a position where the unlocked state retaining lever disengages from a second unlock lever.

14. The seat slide apparatus for a vehicle according to claim 2, wherein the second unlocked state release mechanism is configured with the unlock lever to push the unlocked state retaining lever to rotationally move the unlocked state retaining lever to a position where the unlocked state retaining lever disengages from a second unlock lever.

* * * * *